(12) United States Patent
Bellman et al.

(10) Patent No.: US 10,758,078 B2
(45) Date of Patent: Sep. 1, 2020

(54) APPARATUS AND METHOD FOR INFUSING AND DISPENSING OILS, AND DRYING AND HEATING INFUSING MATERIALS

(71) Applicant: LEVO OIL INFUSION, LLC, Arvada, CO (US)

(72) Inventors: Christina Spencer Bellman, Denver, CO (US); Joseph Alexander Scaglione, Wayne, NJ (US); Randon Kruse, Denver, CO (US); Mark Soderberg, Conifer, CO (US)

(73) Assignee: LEVO OIL INFUSION, INC., Denver, CO (US)

( * ) Notice: Subject to any disclaimer, the term of this patent is extended or adjusted under 35 U.S.C. 154(b) by 45 days.

(21) Appl. No.: 16/013,891

(22) Filed: Jun. 20, 2018

(65) Prior Publication Data
US 2018/0303277 A1   Oct. 25, 2018

Related U.S. Application Data

(60) Continuation-in-part of application No. 15/711,242, filed on Sep. 21, 2017, now Pat. No. 10,039,413,
(Continued)

(51) Int. Cl.
*A47J 31/41*    (2006.01)
*B01F 13/08*    (2006.01)
(Continued)

(52) U.S. Cl.
CPC .............. *A47J 31/41* (2013.01); *A23D 9/007* (2013.01); *A23D 9/02* (2013.01); *A23D 9/04* (2013.01);
(Continued)

(58) Field of Classification Search
CPC ........ B01D 23/00; B01D 23/20; B01D 29/88; B01D 29/92; B01D 35/02; B01D 35/027;
(Continued)

(56) References Cited

U.S. PATENT DOCUMENTS 2,188,969 A * 2/1940 Waldvogel ............. A23N 12/10
99/468
2,667,114 A   1/1954 Burgess
(Continued)

FOREIGN PATENT DOCUMENTS

DE    4317902 A1   12/1994
WO    9934716 A1   7/1999

OTHER PUBLICATIONS

Office Action dated Feb. 3, 2020 issued in Chinese Application No. 201780060268.6.
(Continued)

*Primary Examiner* — Joseph W Drodge
(74) *Attorney, Agent, or Firm* — VOZ Patents, LLC.

(57) ABSTRACT

The present invention pertains in general to an apparatus and method for the drying and activating of infusing material, and the infusing, agitation and dispensation of oils in a controlled manner to produce a desired potency of an infusion while remaining below an identified maximum temperature threshold.

12 Claims, 23 Drawing Sheets

Related U.S. Application Data which is a division of application No. 15/428,765, filed on Feb. 9, 2017, now Pat. No. 9,795,246.

(60) Provisional application No. 62/401,369, filed on Sep. 29, 2016.

(51) Int. Cl.

| | |
|---|---|
| B01F 7/00 | (2006.01) |
| A23D 9/02 | (2006.01) |
| A23D 9/04 | (2006.01) |
| B01D 35/18 | (2006.01) |
| B01D 29/92 | (2006.01) |
| B01D 35/027 | (2006.01) |
| B01D 35/15 | (2006.01) |
| B67D 3/00 | (2006.01) |
| B01F 15/00 | (2006.01) |
| B01F 15/02 | (2006.01) |
| A23D 9/007 | (2006.01) |
| B01D 35/157 | (2006.01) |

(52) U.S. Cl.
CPC ........... *B01D 29/92* (2013.01); *B01D 35/027* (2013.01); *B01D 35/1573* (2013.01); *B01D 35/18* (2013.01); *B01F 7/00041* (2013.01); *B01F 13/0818* (2013.01); *B01F 13/0854* (2013.01); *B01F 15/00175* (2013.01); *B01F 15/00396* (2013.01); *B01F 15/0276* (2013.01); *B67D 3/0061* (2013.01)

(58) Field of Classification Search
CPC .. B01D 35/157; B01D 35/1573; B01D 35/18; B01D 35/20; B01D 35/30; B01D 2201/16; B01D 2201/167; B01D 2221/00; B01D 2221/02; B01D 2221/10; B01F 1/00; B01F 1/0011; B01F 2001/0088; B01F 2001/0094; B01F 3/22; B01F 3/2261; B01F 3/2284; B01F 15/00175; B01F 15/00396; B01F 15/02; B01F 15/0266; B01F 15/0267; B01F 15/0274; B01F 15/0276; B01F 15/0292; B01F 15/0293; B01F 15/06; B01F 15/065; B01F 15/08; B01F 15/0827; B01F 15/0854; B01F 2015/062; B01F 2215/0026; B01F 2215/0032; B01F 13/0854; B01F 13/0818; B01F 7/00041; B65D 47/04; B65D 47/20; B65D 2590/54; B65D 2590/66; B65D 2590/662; B67D 3/00; B67D 3/0022; B67D 3/0025; B67D 3/0058; B67D 3/0061; B67D 2210/00005; B67D 2210/0001; B67D 2210/00099; B67D 2210/00102; C02F 1/00; C02F 1/002; C02F 1/003; C02F 1/02; C02F 2209/02; F16K 3/18; F16K 3/184; F16K 3/186; F16K 3/24; F16K 3/243; F16K 31/02; F16K 31/3046; F16K 31/06; F16K 31/0644; F16K 31/52; F16K 31/52408; F16K 31/52441; F16K 31/602; A47J 31/41; A23D 9/02; A23D 9/007; A23D 9/04

USPC ...... 99/279–281, 287, 288, 289, 289 R, 304, 99/316, 317, 323.3; 210/179, 184, 186, 210/464, 469, 473, 474, 482; 251/66, 68, 251/74, 111, 114–116, 129.01, 129.02, 251/203, 231, 233, 236, 238, 242, 243, 251/251, 262, 263; 222/54, 146.1, 146.2, 222/189.06, 189.11; 366/127, 142, 145, 366/147, 192, 273, 274

See application file for complete search history.

(56) References Cited

U.S. PATENT DOCUMENTS

| | | | | |
|---|---|---|---|---|
| 2,935,236 | A | * | 5/1960 | Mueller ............... B67D 3/0022 222/425 |
| 3,113,503 | A | * | 12/1963 | Vulliet-Durand ....... A47J 31/32 99/282 |
| 3,221,637 | A | * | 12/1965 | Small ..................... A47J 31/32 99/289 R |
| 3,413,908 | A | | 12/1968 | Philip |
| 3,446,137 | A | | 5/1969 | Pryor et al. |
| 3,878,360 | A | * | 4/1975 | Augustine ............. A47J 31/106 392/444 |
| 4,196,342 | A | | 4/1980 | Chailloux |
| 4,565,121 | A | * | 1/1986 | Ohya ..................... A47J 31/56 392/445 |
| 4,682,537 | A | | 7/1987 | Snowball et al. |
| 7,047,870 | B2 | | 5/2006 | Gantt et al. |
| 7,240,610 | B2 | | 7/2007 | Wimmer et al. |
| 7,469,268 | B2 | | 12/2008 | Balle et al. |
| 9,795,246 | B1 | | 10/2017 | Bellman et al. |
| 10,039,413 | B1 | * | 8/2018 | Bellman ............... B01F 7/00041 |
| 2005/0199129 | A1 | | 9/2005 | Glucksman et al. |
| 2006/0035000 | A1 | | 2/2006 | Bunke et al. |
| 2007/0157820 | A1 | | 7/2007 | Bunn |
| 2008/0000357 | A1 | | 1/2008 | Yang et al. |
| 2008/0092747 | A1 | | 4/2008 | Yoakim et al. |
| 2008/0168906 | A1 | | 7/2008 | Pan et al. |
| 2008/0216667 | A1 | | 9/2008 | Garman et al. |
| 2008/0282897 | A1 | * | 11/2008 | Webster .................. A47J 31/56 99/280 |
| 2010/0203209 | A1 | | 8/2010 | Fishbein et al. |
| 2011/0086148 | A1 | | 4/2011 | Ford |
| 2011/0179952 | A1 | | 7/2011 | Radi |
| 2012/0121779 | A1 | * | 5/2012 | Lai ....................... A47J 31/3623 426/433 |
| 2012/0125205 | A1 | * | 5/2012 | Glucksman ............. A47J 31/32 99/302 R |
| 2012/0183659 | A1 | | 7/2012 | Hulett et al. |
| 2013/0045308 | A1 | | 2/2013 | Gorbatenko |
| 2013/0136833 | A1 | | 5/2013 | Vastardis et al. |
| 2013/0305933 | A1 | * | 11/2013 | Heidrich ................ A47J 36/321 99/331 |
| 2015/0017297 | A1 | | 1/2015 | Vastardis et al. |
| 2015/0359378 | A1 | | 12/2015 | Anthony et al. |
| 2015/0359380 | A1 | | 12/2015 | Oleksy |
| 2016/0135635 | A1 | | 5/2016 | Boniello et al. |
| 2016/0243177 | A1 | | 8/2016 | Franklin et al. |
| 2017/0295989 | A1 | | 10/2017 | Burrows |

OTHER PUBLICATIONS

Herb Oil Infuser, Website [Online}. Uncommon Goods [Retrieved Mar. 24, 2017]. Retrieved from the Internet: <URL:http://www.uncommongoods.com/product/herb-oil-infuser>.[Attachment].

Herbal Oil Infuser, Website [Online]. Oblend [Retrieved Dec. 19, 2017]. Retrieved from the Internet: <URL: www.oblend. com>. [Attachment].

Herbal Extractor, Website [Online]. Extract Craft [Retrieved Dec. 19, 2017]. Retrieved from the Internet: <URL:http://www.extractcraft.com/>. [Attachment].

MagicalButter.com, PBC, Website[Online]. Magical Butter, 2017 [Retrieved Mar. 24, 2017]. Retrieved from the Internet: <URL:https://magicalbutter.com/>. [Attachment].

Search History for PCT Application No. PCT/US 17/54434 to Levo Oil Infusion, LLC. ISA Communication Jan. 4, 2018. [Attachment].

Search Report for PCT Application No. PCT/US 17/54434 to Levo Oil Infusion, LLC. ISA Communication Jan. 4, 2018. [Attachment].

Soy Milk Makers, Website Review [Online]. Top5reviews.com [Retrieved Mar. 24, 2017]. Retrieved from the Internet: <URL:http://soy-milk-makers.top5reviews.com/>. [Attachment].

(56) References Cited

OTHER PUBLICATIONS

Supplemental International Search Report and Written Opinion dated Jun. 16, 2020 issued in European Application No. 17 857 537.9.

* cited by examiner

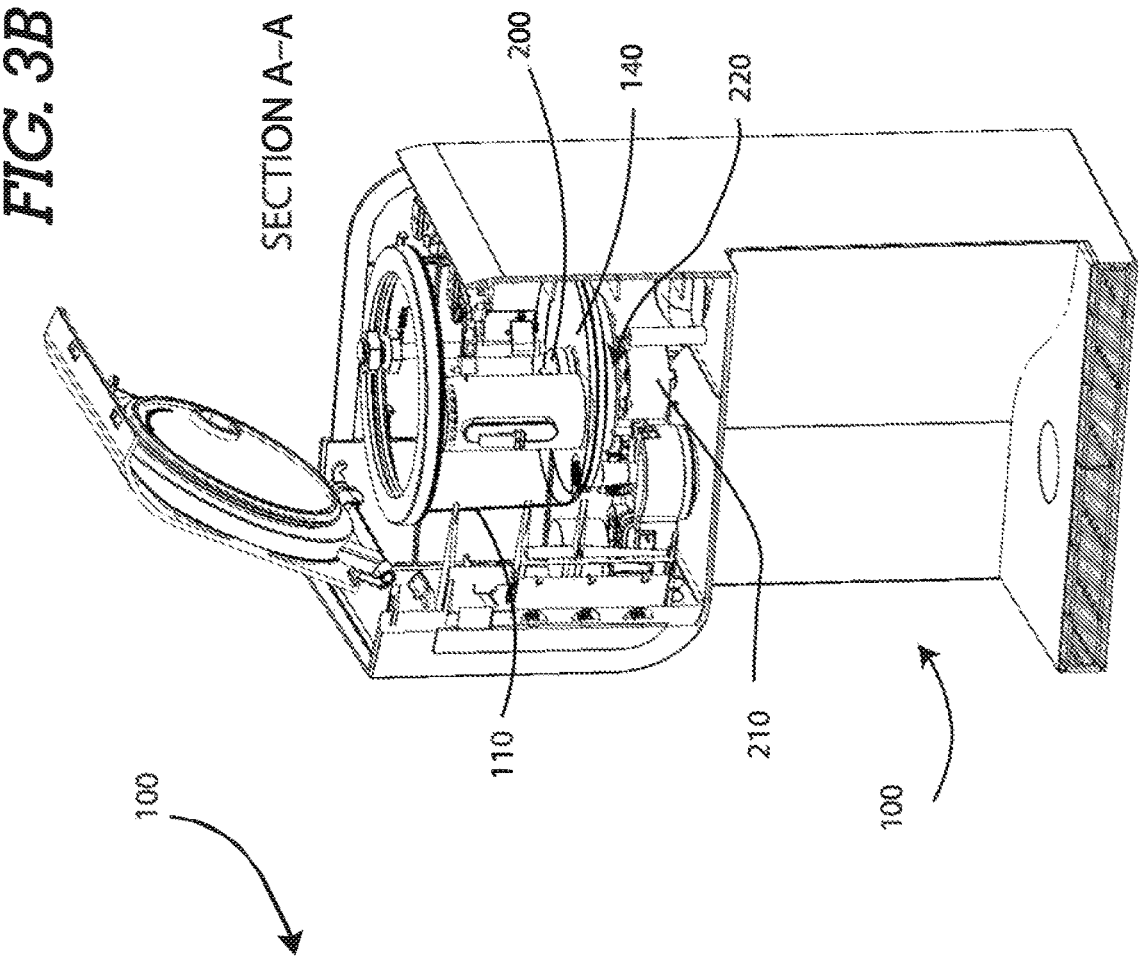
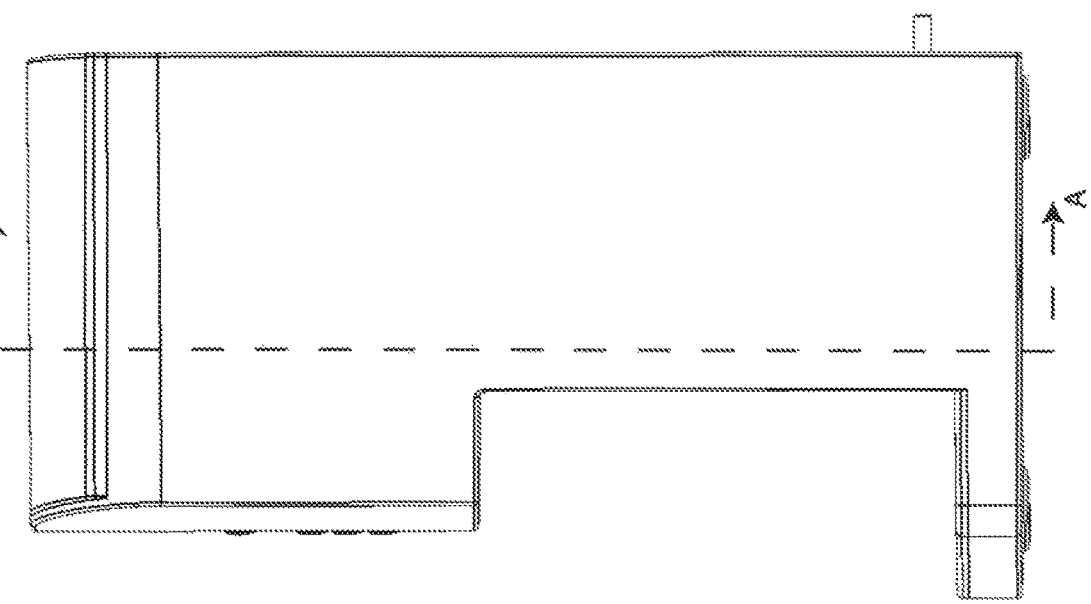

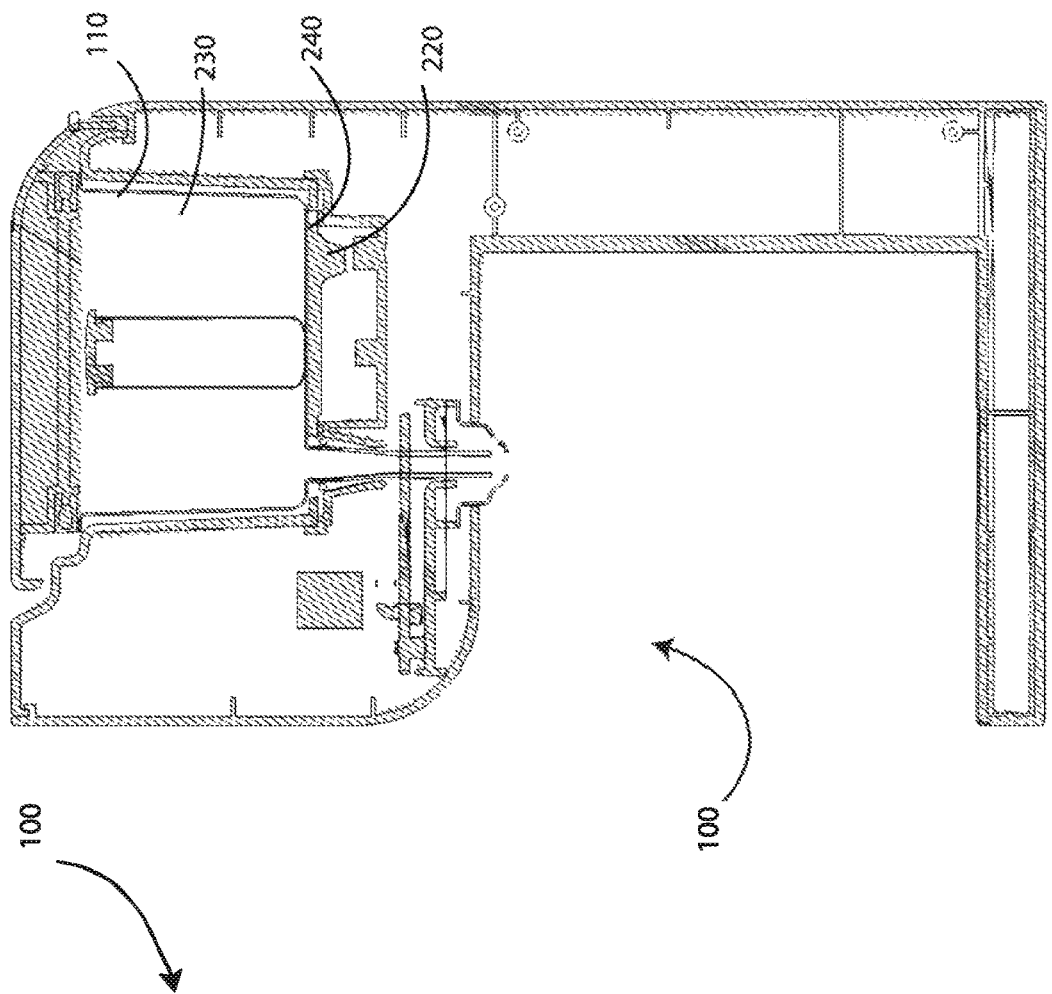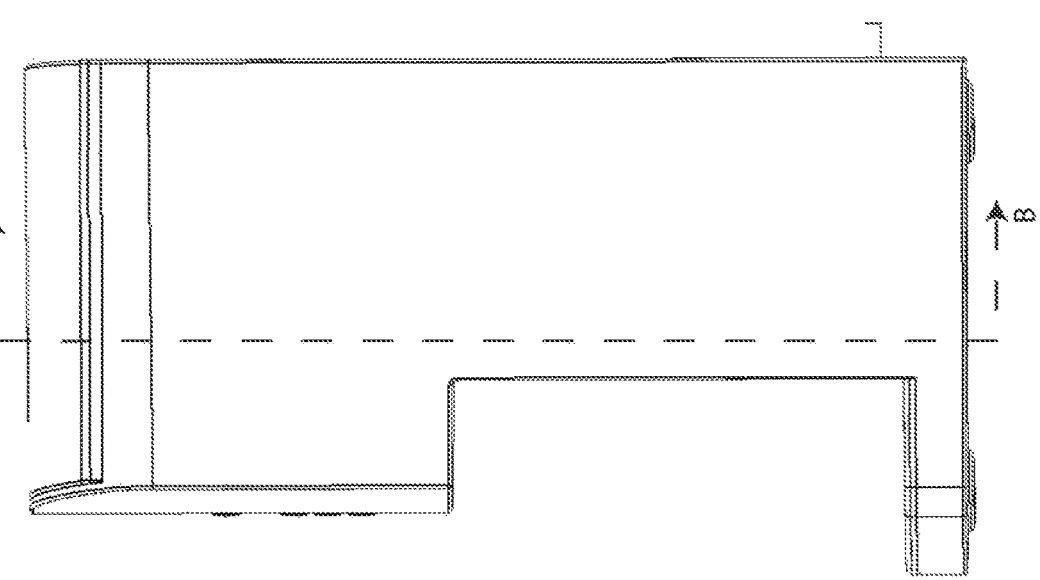

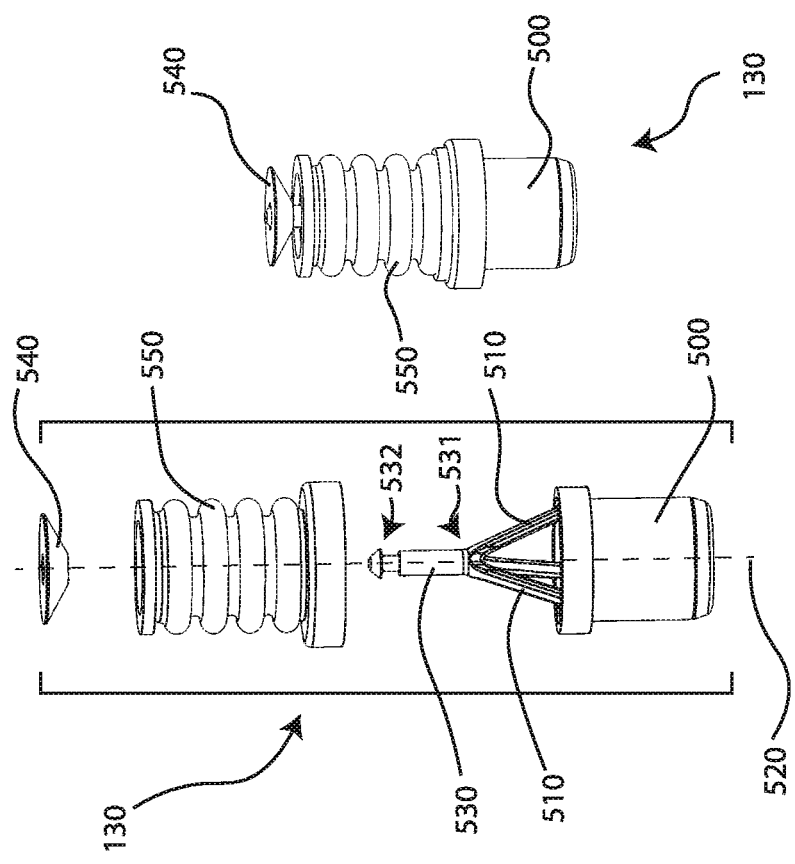
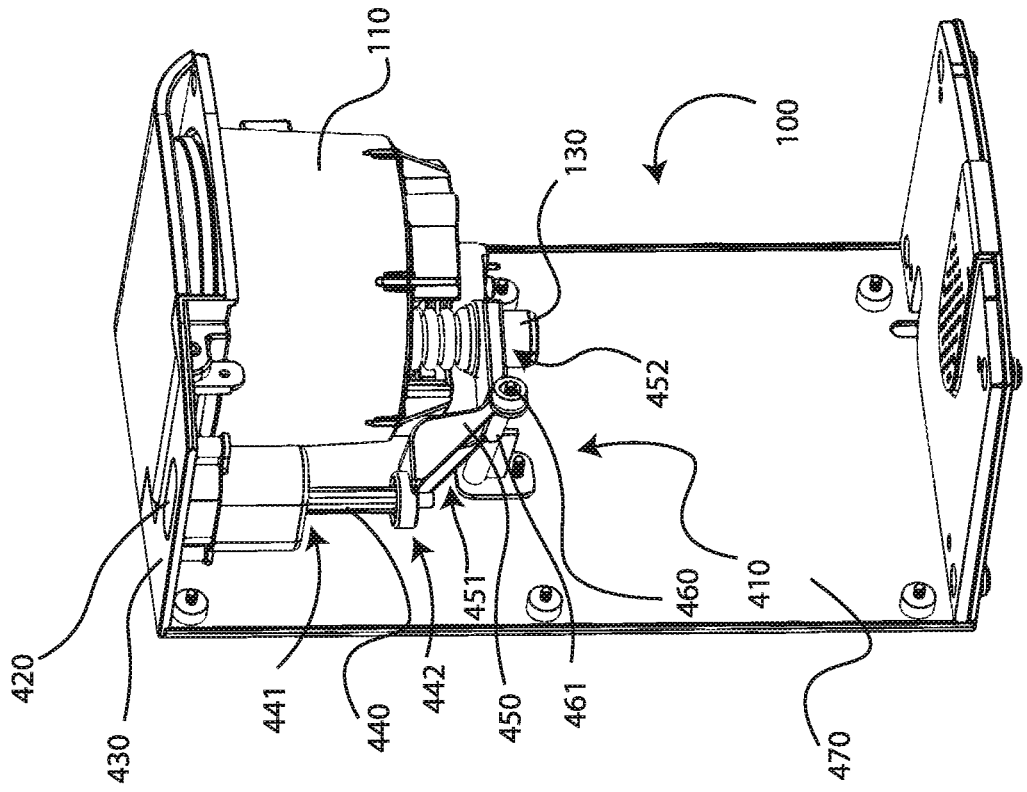
FIG. 7A  FIG. 7B
FIG. 6B

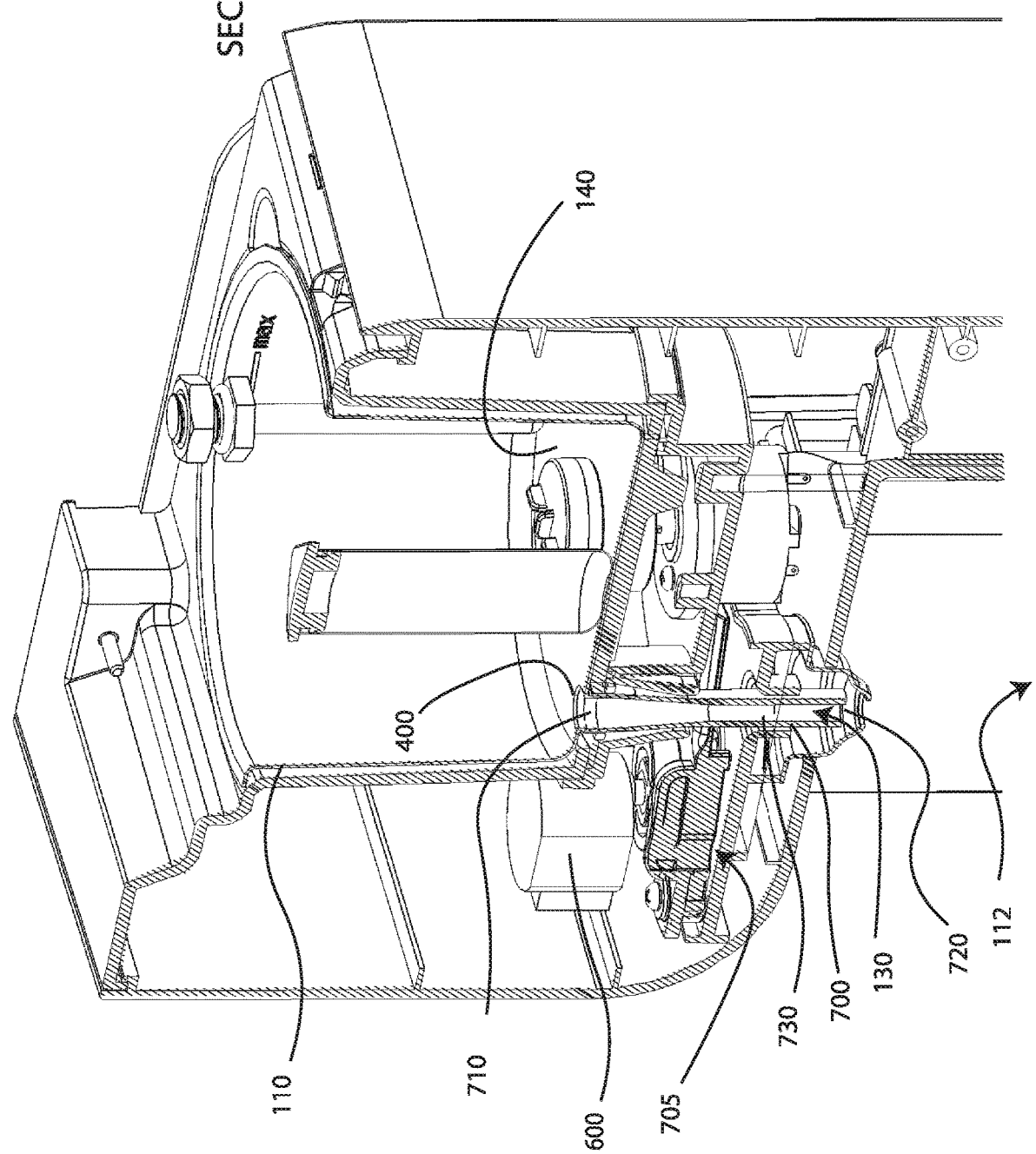

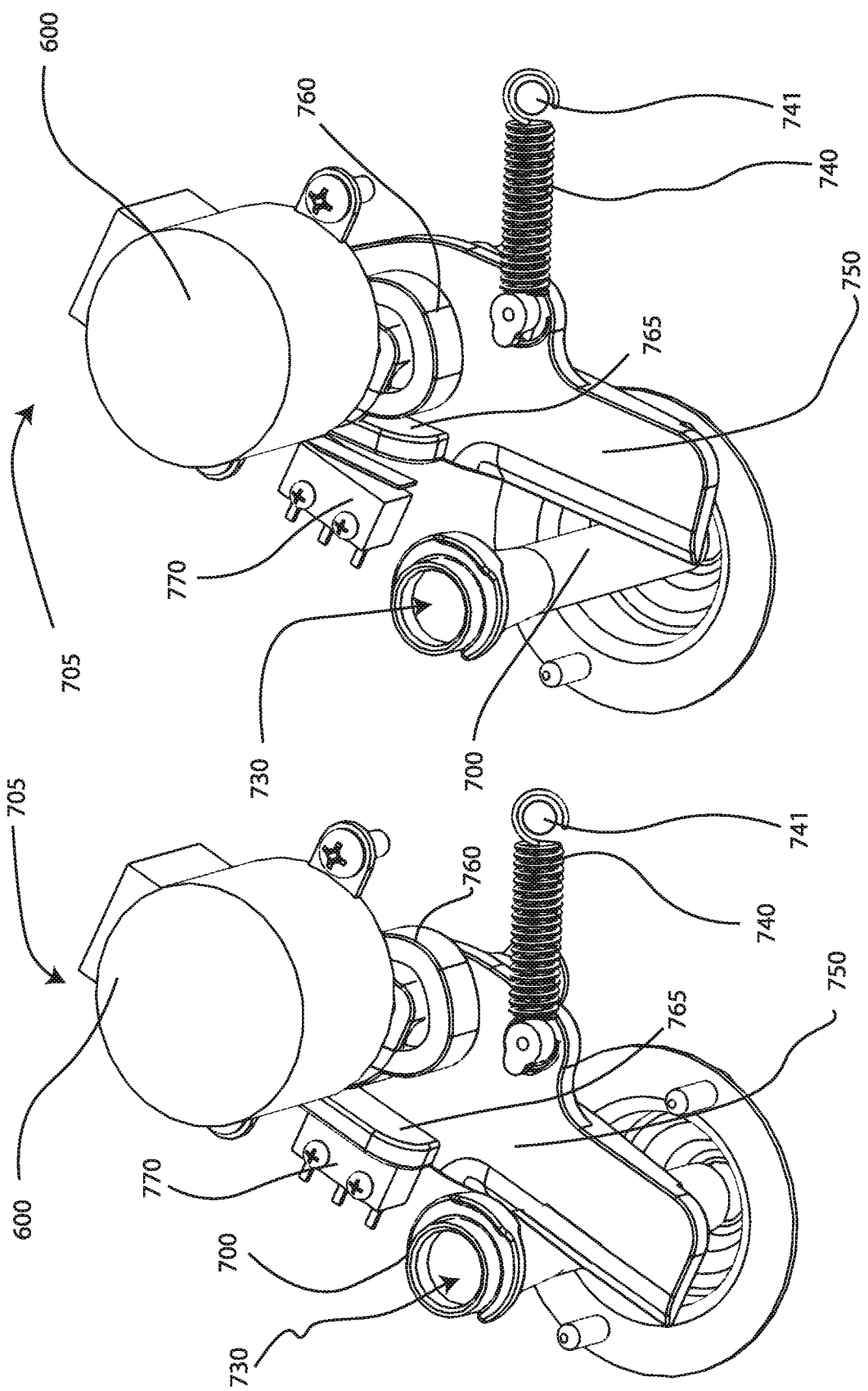

US 10,758,078 B2

APPARATUS AND METHOD FOR INFUSING AND DISPENSING OILS, AND DRYING AND HEATING INFUSING MATERIALS

CROSS REFERENCE TO RELATED APPLICATIONS

This application is a Continuation in Part Application of U.S. patent application Ser. No. 15/711,242, entitled "Apparatus and Method for Infusing and Dispensing Oils" filed Sep. 21, 2017, which claims priority to U.S. patent application Ser. No. 15/428,765, filed Feb. 9, 2017, which claims priority to U.S. Provisional Patent Application No. 62/401,369 filed Sep. 29, 2016.

FIELD OF THE INVENTION

The present invention pertains in general to an apparatus and method for the infusing, agitation, and dispensation of oils in a controlled manner to produce a desired potency of an infusion while remaining below an identified maximum temperature threshold.

BACKGROUND OF THE INVENTION

The infusing of liquids, water-based and oil-based alike is a conventional practice in many fields including homeopathic medicine, culinary cuisine, skincare, aromatherapy, beauty, alternative wellness and production of beverages. The infusing of oil with infusing material to impart a flavor or chemical characteristic is often accomplished through the immersion of infusing material in a solvent over a period of time. Infusing that occurs over extended periods often occurs at room temperature or in a refrigerated environment. The infusing may alternatively occur at high temperatures in a pot or pan for immediate use in cooking.

Infusing is the process of extracting chemical compounds, nutrients, or flavors from plant based infusing material in a solvent such as water, oil or alcohol, by allowing the plant based infusing material to remain suspended in the solvent over time (a process often called steeping). An infusion is also the name for the resultant liquid produced from an infusing process.

The practice of infusing commonly surrounds the use of botanicals or other plant matter that are volatile and dissolve readily, or release their active ingredients easily in a solvent. Examples of botanicals include, but are not limited to, dried herbs, seeds, flowers or berries.

Steeping, a method of infusing, involves bringing a liquid to a boil (or other desired temperature) prior to incorporation with the botanicals. The incorporated mixture is then allowed to soak in the liquid for a period of time. The liquid may then be strained, or the herbs otherwise removed from the liquid. Unless the infusion is to be consumed immediately, it may then be bottled and stored for future use. It will be appreciated that such infusions can be useful in either standalone use or as an ingredient in recipe or formula.

The length of time the herbs are left in a liquid depends on the purpose for which the infusion is being prepared and the potency of the infusion desired. The length of time for steeping also depends upon ingredients used in the infusion. Some infusing processes may require minutes while others require days, weeks or longer. Typically, the infusing of fats or oil-based solvents require much longer than other solvents.

SUMMARY OF THE INVENTION

The present invention surrounds a method and apparatus for infusing of liquids though heating, agitation and, dispensation of oils in a controlled manner to produce a desired potency of infusion. Embodiments of the present invention as disclosed provide an infusing method and apparatus for infusing of solvents; particularly oils. Certain embodiments provide a faster infusing process, safer infusing of solvents or more complete use of infusing material than existing solutions.

Typically, infusing of solvents with an infusing material surround the use of steeping devices made of metal, plastic or paper configured to provide an enclosed compartment with permeable walls. Such steeping devices are typically filled and placed in a volume of water for infusing. The permeable walls allow the passage of the water to permit the infusing of the solvent to a desired level. Such technologies are typically configured for the infusing of liquids, such as water, for beverages and do not allow for proper infusing for oil-based solvents. Due to higher viscosity, oil-based solvents cannot flow through permeable walls configured for the flow of water or water-based solvents. Furthermore, oil-based solvents commonly require additional heat to reduce the viscosity of the oil-based solvent. Adding heat may also be used to reduce the time needed for infusing.

Certain embodiments of the present invention provide: a heating element for solvent heating, a permeable container with permeable surface configured to allow the flow of oil-based solvents, and an agitator component to create flow of the oil-based solvent through the infusing chamber.

Certain embodiments of the present invention have a permeable container that is removably affixed to an infusing chamber. Benefits of a removably affixed permeable container include ease of use for filling of a permeable container with infusing material and removal of the permeable container for cleaning.

Certain embodiments comprise of an infusing chamber having an outer shell offset from the infusing chamber to create a volume for the purposes of insulative value. Increased insulative value mitigates heat-loss which allows for a more precise controllability of the internal volume of the infusing chamber. Certain embodiments comprise insulation, such as fibrous insulation, between the infusing chamber and the outer shell.

It is an aspect of the present invention to comprise a low temperature dry process, sometimes referred to as a dehydrating process, to remove the moisture content from material prior to further processing or consumption. In certain embodiments, the low temperature dry process involves temperatures of approximately 46° C. (115° F.) for prolonged periods of time. A low temperature dry process serves to remove the moisture content of the material for prolonged shelf-life for the material, as well as any infused solvents which they may be used in.

It is an aspect of the present invention to comprise a high temperature dry process which allows the dehydration of materials such as herbs, botanicals, or materials and causes a chemical reaction to change the nature of the material, as one would when cooking a material. In certain embodiments, surrounding plant-based material for instance, the dry process involves the decarboxylation of the material. This decarboxylation of material is sometimes referred to as "activating" the material as it surrounds a chemical change resulting in the material having desired chemical characteristics. It will be appreciated that the process of decarboxylation is a chemical reaction that removes a carboxyl group (—COOH) and releases carbon dioxide ($CO_2$). Usually, decarboxylation refers to a reaction of carboxylic acids, removing a carbon atom from a carbon chain. In such a dry process, certain embodiments maintain a 110°-149° C.

(230°-300° F.) temperature range. Certain embodiments maintain temperatures outside this identified temperature range while in keeping with the spirit and scope of the present invention.

Some embodiments of an external surface of a permeable container are removably affixed to an internal surface of an infusing chamber using a magnetic connection. Certain embodiments of a magnetic connection use a magnet and a ferromagnetic material, while other embodiments use a plurality of magnets.

It will be appreciated that the viscosity of oil-based solvents decreases as the solvent temperature increases. It is advantageous elevate the temperature of an oil-based solvent to increase the potential flow of such an oil-based solvent through a permeable surface. It will be appreciated that oils may include, but are not limited to: butter, animal fat, or plant-based oils.

Some proposed solutions for infusing oil-based solvents with an infusing material use a sealed container in combination with a heater component and an agitator. In such solutions, the agitator—of a gear-driven or shaft-driven type—is affixed to a cap and the agitator extending downward into the sealed container. Existing methods aim to provide an accelerated and controllable infusing process due to the added heat and agitation. The user adds oil-based solvent and infusing material to the container where they are heated by the heater component. The agitator churns the infusing material and the oil-based solvent, which pulverizes and circulates the infusing material within the oil-based solvent. This pulverization of the infusing material creates infusing material particulate. Where such methods fail surround problems in dispensing the oil-based solvent and filtering infusing material particulate from the infused oil-based solvent. When a user removes the lid, the agitator that extends from the base of the cap into the sealed container drips infused solvent when removed from the infusing container. To dispense the infusing material and infusing material particulate from the resultant infusion, the user pours the heated infusion through a straining device into a second container. This increases cleanup efforts and increases the risk of injury resulting from spilled infusion. Furthermore, such existing methods use agitators with blades, which cause the pulverization of the infusing material and creates infusing material particulate. Sometimes the infusing material particulate is too small to remove from the infusion with a straining device. This results in an unsightly and undesirably cloudy or dirty infusion.

Other infusing apparatuses have an agitator extending downward from a cap into a sealed container with a gear driven or shaft driven agitator mounted to the bottom of the sealed container. However, residual oil-based solvent and infusing material may adhere to the agitator of the infusing apparatus. Residual oil-based solvent and infusing material causes difficulty in cleanup of the apparatus and may contaminate future infusions.

Other devices for the production of infused beverages such as U.S. Pat. No. 4,516,484 ("the '484 Patent") to De Ponti and U.S. Pat. No. 6,422,133 ("the '133 Patent") to Frank, both herein incorporated in full by reference. However, such solutions for infusing of oil-based solvents are only intended for use with water-based liquids. The '484 Patent relies on building pressure based on the boiling point of water under pressure. The use of oil-based solvent in such an apparatus as disclosed in the '484 Patent may create a hazardous scenario potentially resulting in a fire and burn hazard to the user or those surrounding. The '133 Patent is not suited for use with oil-based solvents. The use of a filtering screen with small enough apertures to allow the flow-through of oil-based solvents would filter out infusing material particulate, resulting in a cloudy or dirty infusion. Furthermore, neither the '133 and the '484 Patent fail to provide full infusing potential as the infusing material is not agitated in relation to the solvent.

Embodiments of the present invention surround an infusing apparatus that include the use of an infusing chamber with an agitator component on an interior surface of the infusing chamber, a power supply, a computing device, a permeable compartment, a heating element, and a gravity based drain device. Such embodiments allow for infusing of a solvent with infusing material while limiting pulverization of the infusing material within the solvent. Furthermore, the agitator component is configured such that it does not prevent the removal of the infusing chamber from the infusing apparatus. This mitigates clean-up effort after an infusion is processed. In certain embodiments, the agitator component is a magnetically driven agitator. The magnetically driven agitator provides churning from the bottom of the infusing chamber. A magnetically driven agitator component also addresses some previously discussed problems associated with gear or shaft driven agitators. It may be desired in certain embodiments to limit the rotational speed of the agitator component to be below 200 rotations per minute (RPM), while in other embodiments it may be desired for the agitator component to be between 70 and 90 RPM. The limitation of rotational speed of the agitator component serves to prevent cavitation and other modes which may result in the aeration of the solvent. While it is preferred that the agitator component spins at a rate which does not create aeration of the solvent, it will be appreciated that the RPM of the agitator component may be adjusted infinitely within the capabilities of the agitator component. For instance, an agitator having features which enable a higher RPM without the entrainment of air within the solve can be operated at speeds above those discussed above.

In certain embodiments, a magnetic actuator may be exposed to temperatures in excess of 149° C. (300° F.) comprises high temperature. It will be appreciated by those skilled in the art that certain magnets lose magnetic properties when exposed to extreme heat environments such as those in excess of 177° C. (350° F.). In certain embodiments it is desired to utilize magnets having a high temperature threshold such as temperature resistant rare earth magnets.

In certain embodiments it may be desired to alternatively actuate and stop the rotation of an agitation component. Such practices result in the ability to actuate the agitator component at higher speeds which would typically result in air entrainment if operated over long periods of time. However, periodic actuation of the agitator component over shorter periods of time allow the agitator component to run at higher speeds and stop prior to the entrainment of air. An addition benefit to this practice includes mitigation of the overheating of a motor which actuates the agitator component, thus increasing the operational life span of such components.

The use of a permeable compartment allows for the flow of solvents without the pulverization of the infusing materials, limiting the amount of particulate deposited into the solvent. Certain embodiments of the heating element provide constant control to maintain elevated temperatures of the solvent but not in excess of 100° C. (212° F.). By limiting the temperature of the solvent to 100° C. (212° F.), this greatly reduces the risk of injury due to contact with heated solvents, particularly oil-based solvents. Additionally, certain solvents such as butter and Flaxseed oil have material properties having a boiling point slightly above 100° C. (212° F.). In maintaining the temperature of the solvent to 100° C. (212° F.) or less, this prevents the boiling and aeration due to boiling of the solvent and prevents the solvent from reaching a temperature at which it generates smoke, also referred to as a "smoke point." Additional benefits of limiting maximum infusing process temperature to a predetermined temperature surround the use of temperature sensitive infusing material. Certain infusing materials or solvents used in an infusing process have a temperature threshold at which their chemical structure changes. Examples of such chemical structure changes include, but are not limited to, denaturation, unwanted enzymatic reactions or, unwanted hydrolytic reactions. Setting the infusing process to a particular temperature reduces unwanted changes in chemical compound of those infusing materials and solvents. A gravity-fed drain device allows for dispensing of the solvent after the infusing process without the need to pick up, tip over or otherwise handle or manipulate the infusing chamber. The gravity-fed drain device limits the risk of injury due to contact with heated solvent and reduces cleanup efforts. Other advantages of a gravity fed drain device include the mitigation of solvent aeration when the solvent is dispensed from the infusing apparatus. Aeration is undesirable because it induces cloudiness of the infused solvent. Furthermore, aeration of a solvent intended for human consumption may accelerate spoilage of the solvent due to the air entrained in the solvent. Some problems associated with air entrainment include lipid oxidation and potential microorganism growth. As such, the prevention of aeration within the solvent improves shelf-life, quality and safety of solvents intended for consumption.

It will be appreciated that certain embodiments of the invention may utilize prepackaged units configured to hold infusing material. It will be appreciated that units as used in the infusing process may allow the through-flow of a solvent while the infusing material remains captive within the unit. It will be appreciated that a prepackaged unit may include, but is not limited to, a pod, cup, or other container with permeability allowing the flow-through of a solvent. Such prepackaged units may be prefilled by a user or third party for use in the infusing of a solvent with a desired infusing material. Furthermore, such prepackaged units may be configured to fit within a permeable compartment. In certain embodiments where a prepackaged unit is configured to fit within a permeable compartment, the permeable compartment may be used to hold such a prepackaged unit in place allowing solvent to flow through a permeable membrane of the prepackaged unit. It will be appreciated that such prepackaged units may be reusable or disposable in nature. It will be further appreciated that a disposable or reusable prepackaged unit may be constructed of biodegradable material.

Certain embodiments of the present invention provide a modular functionality so a user may remove components like the agitator component, permeable compartment, infusing chamber and/or the gravity-fed drain for ease of cleaning. Certain embodiments of the invention use materials including, but not limited to Polyethylene (PE), copolyesters, Acrylonitrile Butadiene Styrene (ABS), Melamine, Nylon, Polypropylene (PP), Polystyrene (PS), Silicone, Glass, Ceramic, Stainless Steel or any other materials appreciated to be appropriate for cleaning in a dishwasher appliance.

These and other advantages will be apparent from the disclosure of the inventions contained herein. The above-described embodiments, objectives, and configurations are neither complete nor exhaustive. As will be appreciated, other embodiments of the invention are possible using, alone or in combination, one or more of the features set forth above or described in detail below. Further, this Summary is neither intended nor should be construed as being representative of the full extent and scope of the present invention. The present invention is set forth in various levels of detail in this Summary, as well as in the attached drawings in the detailed description below, and no limitation as to the scope of the present invention is intended to either the inclusion or non-inclusion of elements, components, etc. in this Summary. Additional aspects of the present invention will become more readily apparent from the detailed description, particularly when taken together with the drawings and the exemplary claims provided herein.

DETAILED DESCRIPTION

Figure 1A:
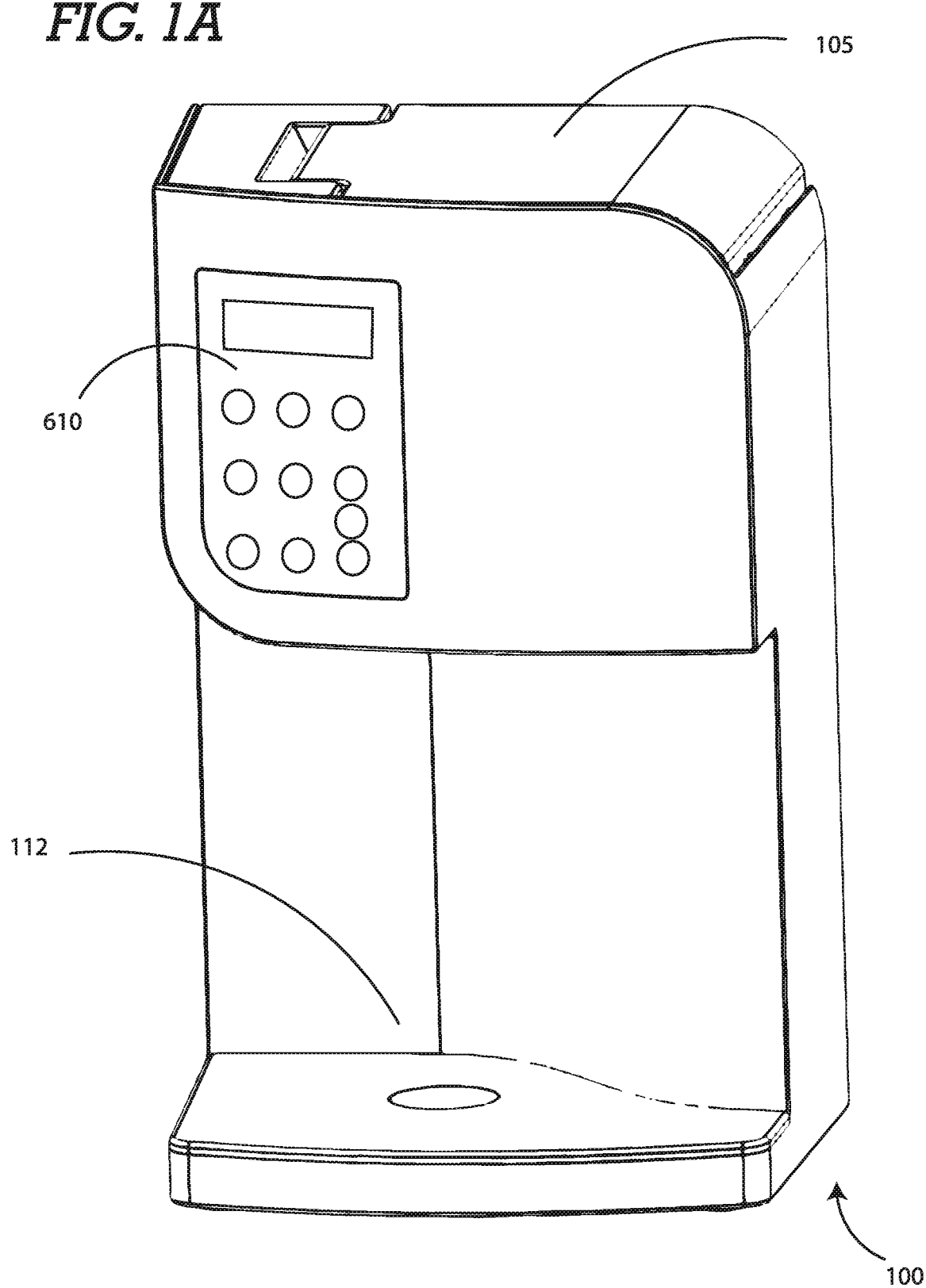
FIG. 1A—Perspective view of certain embodiments of a front of an infusing apparatus FIG. 1B—Perspective overhead view of certain embodiments of an infusing apparatus in an open configuration FIG. 2—Perspective overhead view of certain embodiments of an infusing apparatus in an open configuration FIG. 3A—Side view of certain embodiments of an infusing apparatus FIG. 3B—Perspective Cross-sectional view of certain embodiments of an infusing apparatus FIG. 4A—Side view of certain embodiments of an infusing apparatus FIG. 4B—Front Cross-sectional view of certain embodiments of an infusing apparatus FIG. 5—Certain embodiments of a temperature control loop FIG. 6A—Transparent perspective view of certain embodiments of an infusing chamber FIG. 6B—Perspective view of an infusing apparatus showing a drain device and actuating mechanism FIG. 7A—Exploded view of certain embodiments of a gravity-fed drain device FIG. 7B—Assembled view of certain embodiments of a gravity-fed drain device FIG. 8—Perspective cross-sectional view of certain embodiments of an infusing apparatus FIG. 9A—Perspective view of certain embodiments of a closure mechanism in a closed-state FIG. 9B—Perspective view of certain embodiments of a closure mechanism in an open-state FIG. 10—Perspective transparent view of an infusing chamber FIG. 11—Embodiments of a method for infusing a solvent FIG. 12A—A perspective view of an agitator of certain embodiments FIG. 12B—A top view of an agitator of certain embodiments FIG. 13—A process flow diagram for the control for the operation of an apparatus in certain embodiments FIG. 14A—A cross sectional front view of an apparatus of certain embodiments FIG. 14B—An enlarged cross sectional front view of an apparatus of certain embodiments FIG. 15A—A perspective view of an oblong permeable container of certain embodiments FIG. 15B—A top view of an oblong permeable container of certain embodiments FIG. 15C—A top view of an apparatus of certain embodiments comprising an oblong permeable container FIG. 16A—A perspective view of a rack of certain embodiments FIG. 16B—A perspective view of a rack of certain embodiments FIG. 17—A perspective front view of an apparatus of certain embodiments FIG. 18A—A perspective front view of an apparatus of certain embodiments FIG. 18B—A perspective rear view of an apparatus of certain embodiments
Figure 1B:
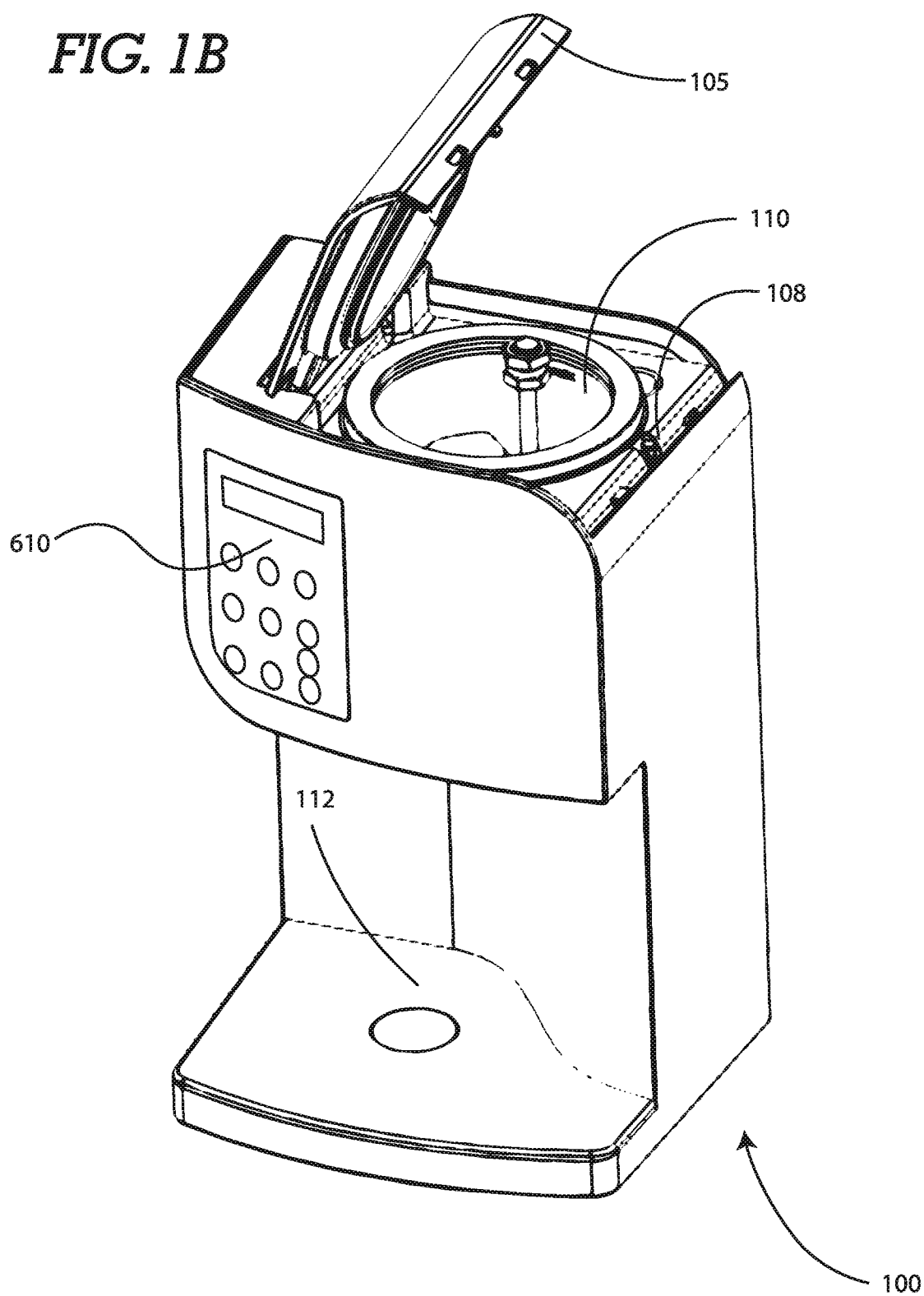

Certain embodiments of an infusing apparatus 100, seen in FIG. 1A and FIG. 1B, are configured for the infusing of solvents, including oil-based solvents. Such embodiments comprise a user interface panel 610, a hinged lid 105, and a dispensing area 112 for draining solvent after an infusing process. Certain embodiments, as shown in FIG. 1B further comprise a lid-release mechanism 108 and an infusing chamber 110. It will be appreciated that in certain embodiments a user interface panel 610 comprises a printed circuit board (PCB), central processing unit (CPU), or other computing device to provide control, sensing, and programming capabilities to the infusing apparatus 100.

Figure 2:
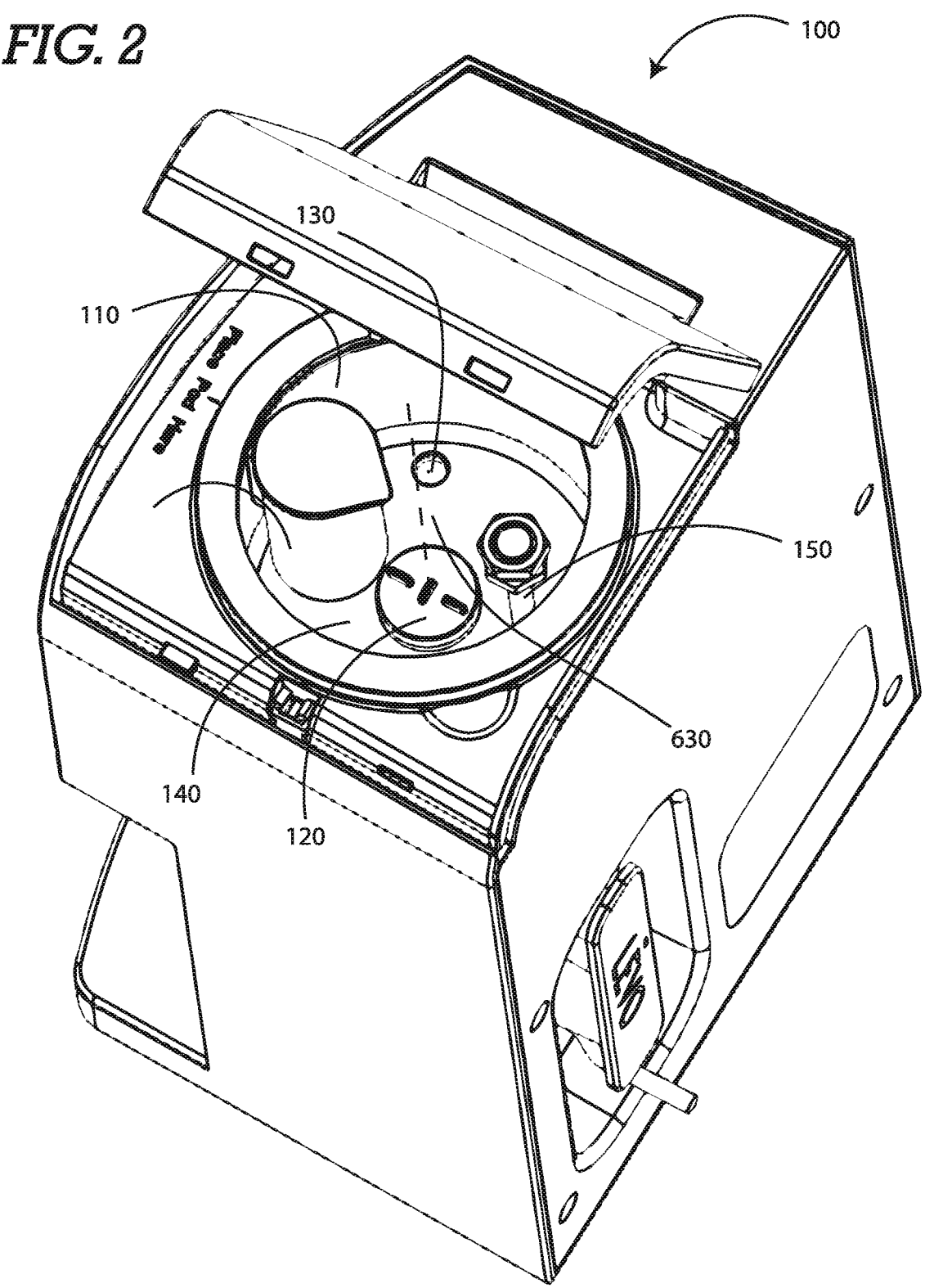

Certain embodiments, as seen in FIG. 2, comprise an infusing chamber 110, an agitator component 120, and a gravity-fed drain device. In such embodiments, the infusing chamber 110 is configured as a shell form to receive a volume of solvent for the infusing process. The agitator component 120, disposed on a bottom surface 140 of the infusing chamber 110 provides churning through rotational movement about an axis 135. The gravity-fed drain device of the infusing apparatus 100 is configured to allow the dispensation of a solvent held within the infusing apparatus 100 without the need to pick up, tip over or otherwise manipulate the infusing apparatus 100.

In certain embodiments of an infusing apparatus 100 comprising an agitator component 200, referencing FIG. 3A and FIG. 3B, the agitator component 200 further comprises a magnetically actuated agitator. The magnetically actuated agitator comprises an agitator component 200 having magnetic characteristics. The agitator component 200 is spun using a rotating magnetic field proximal to the agitator component 200. In certain embodiments, the agitator component 200 rests on the internal bottom surface 140 of the infusing chamber 110 while a rotating magnetic field component 210 rests on an external side of a bottom surface 140 of the infusing chamber 110. Such an agitator component 200, is configured to mix and induce a rotational flow of solvent without the pulverization of the infusing material. Furthermore, such an agitator component 200 may be coated with a chemically inert coating, such as a polymer or ceramic material. It will be appreciated to those skilled in the art that an agitator component 200 may be spun using a rotating magnet in close proximity to the agitator component as disclosed in U.S. Pat. No. 2,350,534 ("the '534 Patent") to Rosinger, herein incorporated by reference. Alternatively, it will be further appreciated by those skilled in the art that an agitator component 200 may be spun using a stationary electromagnet with a rotating electromagnetic field as disclosed in U.S. Pat. No. 1,242,493 ("the '493 Patent") to Stringham, herein incorporated by reference.

Figure 12A:
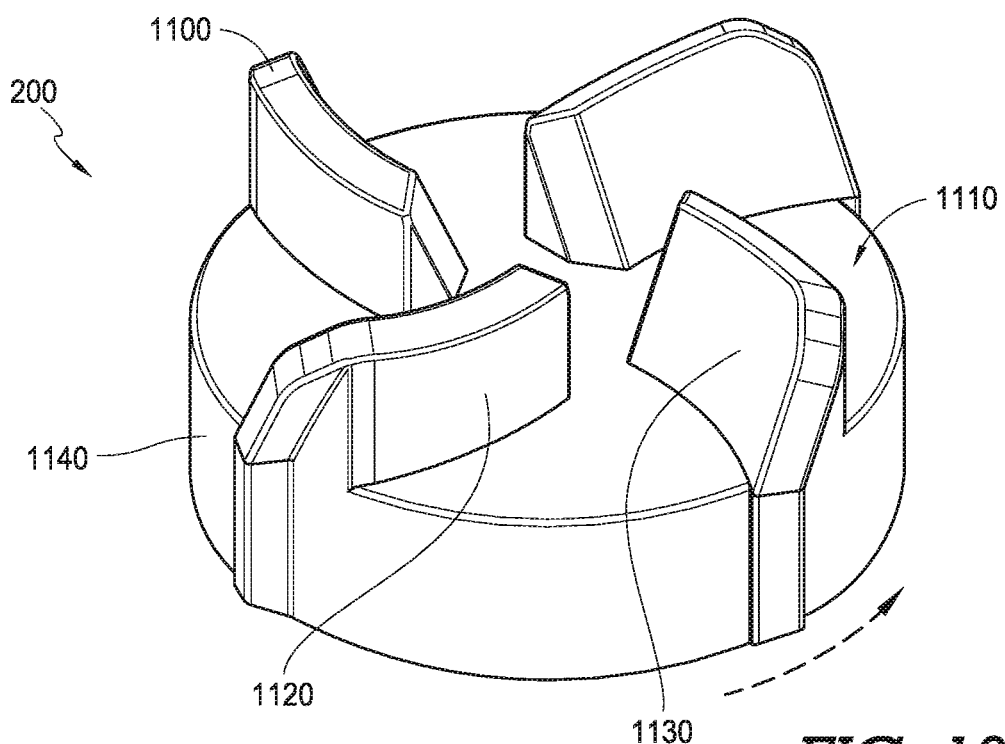
Figure 12B:
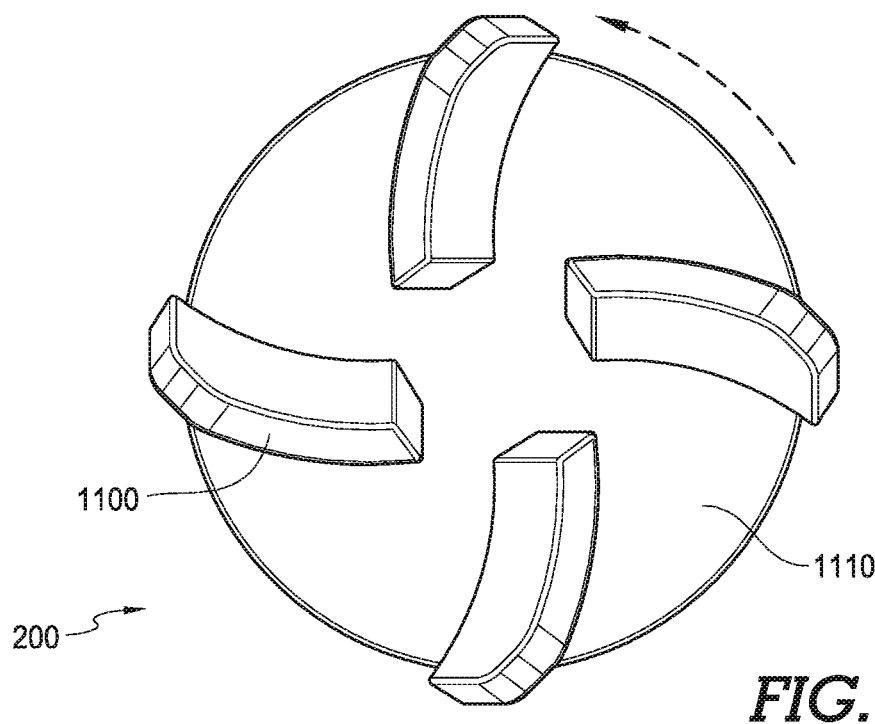

In certain embodiments of the present invention, shown in FIG. 12A-FIG. 12B, an agitator component 200 comprises fins 1100 having a radial curvature. The fins 1100, affixed to a top surface 1110 of the agitator component, are distributed radially around the agitator component 200. The agitator component 200 is rotated in a direction such that the convex curvature 1120 of each fin 1100 is presented as a leading edge, and the concave curvature 1130 of the fins are presented as a trailing edge. The curvature of the fins 1100 of the agitator is configured to allow increased stirring speeds with increased stirring and agitation ability while mitigating cavitation and air entrainment into an infusing solvent. Certain embodiments comprise an agitator component 200 with fins 1100 having a radial curvature, with fins 1100 extending to a side surface 1140 or perimetral surface of the agitator component.

Certain embodiments of the present invention, as shown in FIGS. 3A and 3B further comprise a heater component 220 to provide heat to a solvent held by an infusing chamber. The heater component 220 serves to provide thermal energy to a solvent during the infusing process. It will be appreciated that such a heater component 220 may provide heat directly to a solvent held within the infusing chamber 110. It will be further appreciated that alternative forms of such a heater component 220, as seen in FIG. 4A and FIG. 4B, may provide heat to the solvent 230 indirectly by providing heating energy external to the infusing chamber 110. In certain embodiments, the heater component 220 is external to the infusing chamber 110 in close proximity to or in contact with the bottom external surface 240 of the infusing chamber 110. In such embodiments the heater component 220 applies heat energy to the infusing chamber 110 which transfers through infusing chamber 110 to the solvent 230 by way of conduction, convection, and/or radiation.

Figure 5:
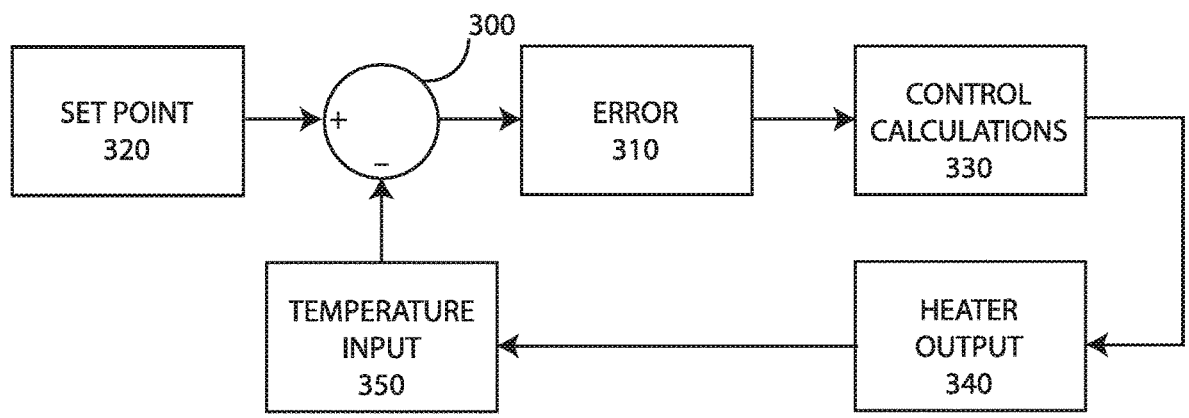

Certain embodiments, as seen in FIG. 2, comprise a temperature measuring device 150 that measures the temperature of a solvent held within the infusing chamber 110. It will be appreciated by those skilled in the art, that the measurement of temperature may be output to a temperature controller such as a thermostat. In certain embodiments, a temperature controller 300, as seen in FIG. 5, receives temperature input 350 in the form of an electrical signal from the temperature measuring device 150 shown in FIG. 2. The temperature input 350 by the temperature controller 300 to determine the error 310 between the temperature input 350 and the desired set-point 320. The temperature controller 300 then performs control calculations 330 to determine the electrical output to control the heater output 340. It will be appreciated that a device maintaining the temperature of a solvent 230 may comprise a proportional-integral-derivative (PID) controller, thermostat or other temperature control devices known to those known in the art. It will be appreciated that a PID controller in such embodiments continuously calculates an error value as the difference between a desired set point temperature and a measured temperature. The PID controller then attempts to minimize the error value over time by adjustment of the power supplied to the heater component.

It will be appreciated that a first temperature measuring device 150, as seen in FIG. 2 may comprise different forms including but not limited to an infrared thermometer, a thermistor, a thermocouple or other temperature measuring devices known to those skilled in the art. In certain embodiments, a first temperature measuring device and a second temperature device provide increased controllability of the internal volume of the infusing chamber 110.

Figure 14A:
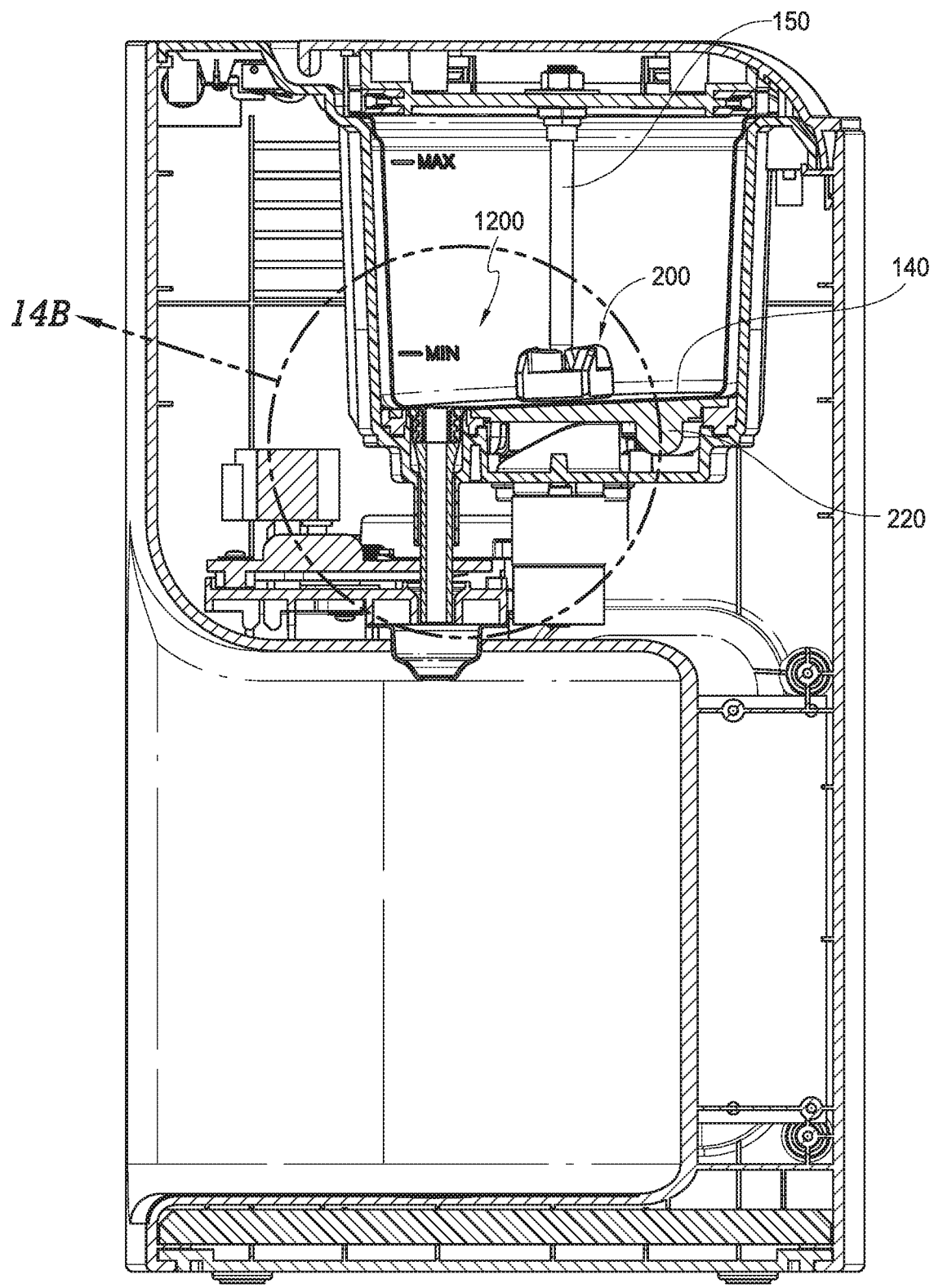
Figure 14B:
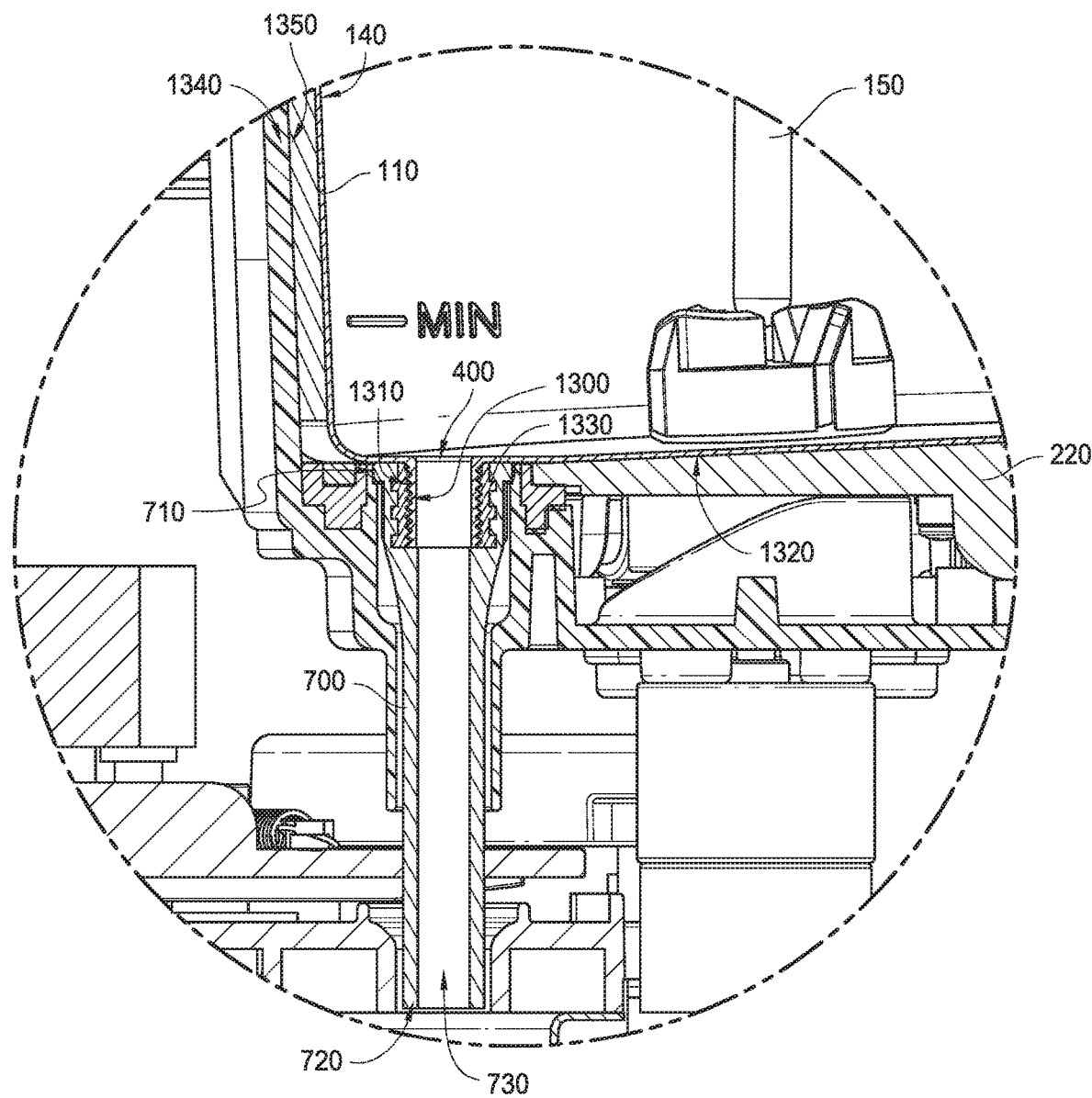

Certain embodiments, shown in FIG. 14A-FIG. 14B comprise a first temperature measuring device 150 in communication with a first temperature controller, and a second temperature measuring device 150 in communication with a second temperature controller. In certain embodiments, the first temperature measuring device 150 (not shown) is in thermal communication with the bottom surface 140 of the infusing chamber, while the second temperature measuring device 150 is in communication with the internal volume of the infusing chamber 110.

Figure 13:
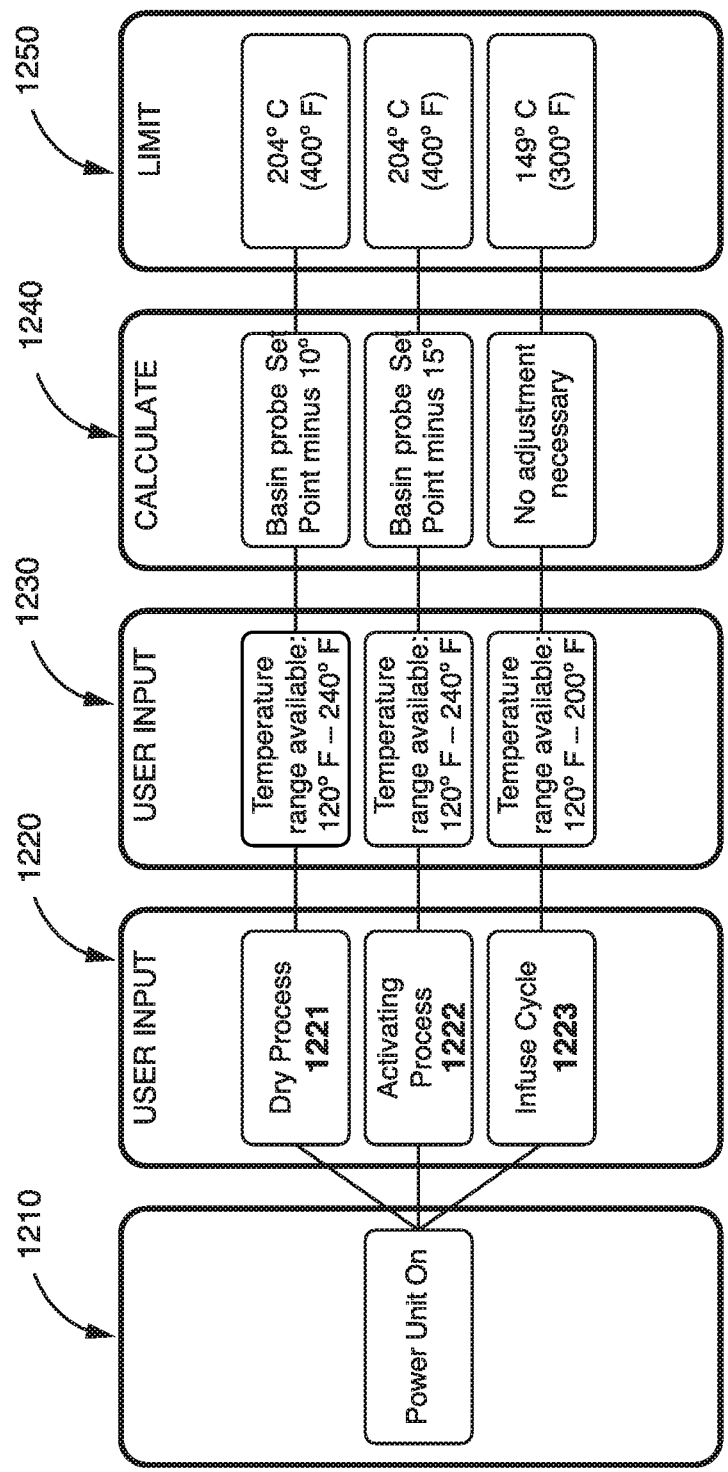

In certain embodiments as shown in FIG. 13, for use of the apparatus—a user powers on 1210 infusing apparatus. The user then provides input 1220 as to determine if the apparatus will operate in the dry process 1221, activation process 1222, or infusing process 1223 mode. The user is then prompted for desired temperature input 1230 based upon the process selected to set the desired air or solvent temperature for the selected process. For a dry process 1221, the available temperature range is 49° C.-115° C. (120° F.-240° F.). For the activation process 1222, the available temperature range is 49° C.-115° C. (120° F.-240° F.). For the infusing process 1223, the available temperature range is 49° C.-93° C. (120° F.-240° F.). During a calculation step 1240, the temperature controller 300—such as shown in FIG. 5—receives the temperature as measured by the second temperature measuring device 150 (FIG. 14A) to determine whether the heater component 220 (FIG. 14A) should be actuated to provide additional heat or not. During a dry process 1221, a 10° F. offset is used to account for temperature lag. Thus, if a user has selected a dry process with a 93° C. (200° F.) setpoint, if the probe measures 85° C. (185° F.), the temperature controller 300 treats this input as (91° C.) 195° F. and provides heat with the heater component 220. When the second temperature measuring device provides a reading of 88° C. (190° F.), with a 10° offset, the temperature controller 300 treats this input as 93° C. (200° F.) and thus switches the heater component 220 off. If at any point, the first temperature measuring device 150 (not shown), provides a reading exceeding a predetermined limit 1250, the temperature controller 300 switches the heater component 220 off to prevent damage to the infusing apparatus.

In certain embodiments, if the air temperature is below the desired set-point, the controller can provide additional heat using the heater component 220 (FIG. 14A). However, if the air temperature is below the desired set-point and the first temperature measuring device indicates a temperature above a predetermined maximum temperature, the heater will not provide additional heat until the temperature of the first temperature measuring device indicates a temperature below the predetermined maximum temperature. Furthermore, in certain embodiments a mechanical temperature regulator device, such as a bi-metallic strip thermostat, is configured to open the electrical circuit to further prevent further heating and potential overheating and damage of the infusion apparatus. Certain embodiments of the present invention comprise a first temperature measuring device and a second temperature measuring device in communication with a central processing module, such as a micro-controller, to control the temperature within the apparatus as desired by the user.

In certain embodiments, the apparatus comprises materials including, but not limited to polysulfone, liquid-crystal polymer (LCP), and Polyphenylene sulfide (PPS). Such polymer compositions are known for their high performance in many categories associated with manufacture and use, including their high heat resistance—withstanding temperatures in excess of 204° C. (400° F.) in some cases. Such polymers provide a high-temperatures to heat without degradation of form or material properties.

Figure 6A:
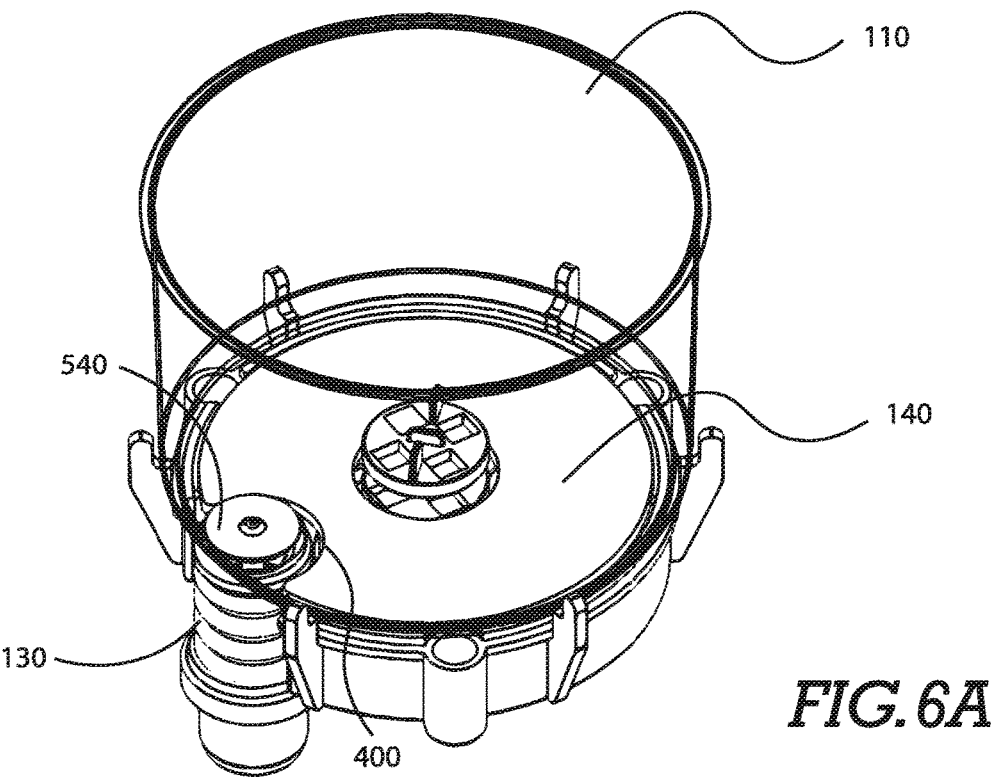

Certain embodiments, as seen in FIG. 6A, comprise a gravity-fed drain device 130. In certain embodiments, a gravity-fed drain device 130 is connected to a bottom surface 140 of the infusing chamber 110 and interfaces with an aperture 400 through the bottom surface 140 of the infusing chamber 110. In certain embodiments, seen in FIG. 14A, the bottom surface 140 of the infusing chamber comprises a contour 1200 directing the solvent toward the aperture 400 in the bottom surface for purposes of complete draining. In certain embodiments, the contour comprises an angle sloping downward toward the aperture in the bottom surface. The angle of the bottom surface, for the purposes of draining, directs the solvent toward the aperture. Although an angled surface of certain embodiments comprises an angle of 3 degrees, the angle is not limited thereto. Furthermore, a contour of is not limited to an angled surface. A contour, in the scope and spirit of the present application, surrounds a configuration which induces the flow of solvents toward the aperture in the bottom surface of the infusing chamber.

Such an aperture 400 is held closed by the gravity-fed drain device 130, preventing the passage of solvent held within an infusing chamber 110. If desired, a user may actuate the gravity-fed drain device 130 it to an open-state, to dispense a solvent held within the infusing chamber 110. It will be appreciated that any state that allows the passage of any amount of solvent through a gravity-fed drain device 130 is considered an open-state. It will be also appreciated that any state that prevents the passage of a solvent through a gravity-fed drain device 130 is considered a closed-state. It will be further appreciated that the actuation of the gravity-fed drain device 130 may be a mechanically actuated or electro-mechanically actuated depending on the nature of the actuation mechanism. It will be appreciated that in other embodiments, a gravity-fed drain device 130 is not limited to use in conjunction with an aperture 400 in the bottom surface 140 of an infusing chamber 110. It will be further appreciated that a gravity-fed drain device 130 generally provides dispensing functionality through an aperture located below the surface level of a liquid.

In certain embodiments, a gravity-fed drain device 130, seen in FIG. 6B, is mechanically actuated and comprises an actuation mechanism 410 comprising a push-button 420 connected to the gravity-fed drain device 130 through a series of mechanical linkages. The push-button 420 extends through an external surface 430 of an infusing apparatus 100. The bottom of the push-button 420 is attached to a first distal end 441 of a rigid linkage 440, which is directed toward a pivoting linkage 450. A second distal end 442 of the rigid linkage 440 is affixed to a first distal end 451 of a pivoting linkage 450. A second distal end 452 of the pivoting linkage 450, is on opposite side of a pivot point 460, which disposed between the first distal end 451 and the second distal end 452 of the pivoting linkage 450. The pivot point 460 of the pivoting linkage 450 is constrained by a rod feature 461 extending which affixes to a planar surface 470 of the infusing apparatus 100. When the first distal end 451 of the pivoting linkage 450 traverses in a first direction, the second distal end 452 of the pivoting linkage 450 traverses in a second direction. When the second distal end 452 of the pivoting linkage 450, having connection to a gravity-fed drain device 130, traverses in a second direction, the gravity-fed drain device 130 actuates to an open-state.

In certain embodiments, a gravity-fed drain device 130, seen in FIG. 7A, comprises a cylindrical form 500 having a plurality of supports 510 extending radially inward from the circumference of the cylindrical form 500 toward the central axis 520 of the cylindrical form. The supports 510 meet centrally, where they affix to a first distal end 531 of a push-rod 530 extending vertically upward from the supports 510. A second distal end 532 of the push-rod 530 is affixed to an aperture seal 540. The aperture seal 540, disposed substantially perpendicular to the push-rod 530, comprises a form configured to mate with an aperture 400, as seen in FIG. 6A, and extends through the bottom surface of an infusing chamber 110. This creates a seal between the aperture seal 540 and the aperture 400 to prevent the passage of solvent through the aperture 400. Referring now to FIGS. 7A and 7B, a collapsible cylindrical device 550 extends between the cylindrical form 500 of the gravity-fed drain device 130 and the perimeter of the aperture 400 in FIG. 6A to form a seal. When the seal between the aperture 400 and the aperture seal 540, is released, solvent is permitted to flow through the aperture 400. The solvent may then flow through the collapsible cylindrical device 550, once again referencing FIG. 7B, and through the cylindrical form 500.

It will be appreciated that, the actuation of a electromechanically actuated gravity-fed drain device 130, shown in FIG. 8, may be performed with an electric actuator 600 such as a linear actuator, stepper motor, servo motor or other electrically actuated device known to those skilled in the art. Certain embodiments, as seen in FIG. 8, comprise an electric actuator 600 with a closure mechanism 705 to a gravity-fed drain device 130 such that when the electric actuator 600 is actuated, it actuates the gravity-fed drain device 130 into an open-state. In certain embodiments, control of the electric actuator 600 is located on a user interface panel 610, seen in FIG. 1A-FIG. 1B, located on an external surface of the infusing apparatus 100.

Certain embodiments of a gravity-fed drain device 130, as seen in FIG. 8, comprise a tube 700 having a first distal end 710 configured to interface with an aperture 400 on bottom surface 140 of an infusing chamber 110 creating a seal. Such tube 700 has a second distal end 720 which is directed toward a dispensing area 112 for the dispensing of an infused oil. The tube 700, has a pathway 730 from the first distal end 710 to the second distal end 720 for the flow of infused solvent. In certain embodiments a tube 700, as shown in FIG. 8, comprises elastic or semi-elastic material properties such that the tube may be deformed by an applied force and rebound to original or substantially original form upon the removal of such an applied force. In certain embodiments, the tube 700 may be deformed by lateral deflection thereby constricting or closing the pathway.

Certain embodiments, seen in FIG. 14B, comprise a tube 700 having a female threaded feature 1300 at the first distal end 710 of the tube for fixation to the underside 1320 of the infusing chamber. In such embodiments, a threaded male feature 1310, having a pathway 730 therethrough, is consistent with the aperture 400 of the infusing chamber. The female threaded feature 1300 is configured to mate with the male threaded feature 1310, thus affixing the tube 700 to the infusing chamber 110 and preventing unintentional disconnection. In certain embodiments, the tube comprises a polymeric composition such as silicone, which is overmolded over a female threaded feature 1310 having attachment features 1330 configured to retain the tube to the female threaded feature 1300. In certain embodiments, the attachment features 1330 comprise knurling or other friction modifying features, while certain embodiments comprise annular rings resulting in undercut features as shown in FIG. 14B.

In certain embodiments, seen in FIG. 14A-FIG. 14B, an outer shell 1340 surrounds the infusing chamber 140, creating an airgap 1350 between the infusing chamber 140 and the outer shell 1340. The airgap 1350 provides insulative properties in order to maintain consistent temperatures as desired within the infusing chamber 140. The insulative characteristics also allow the maintenance of higher temperatures requiring lower energy consumption due to lower heat transfer rates to the ambient environment. In certain embodiments, the airgap is filled with a material having insulative properties.

In certain embodiments of a gravity-fed drain device, as shown in FIG. 9A and FIG. 9B, a closure mechanism 705 comprises a pivoting lever 750 and a spring 740. It will be appreciated that a spring 740 as disclosed, has a first end connected to said pivoting lever 750 and a second end affixed to a static element 741 to provide tensile force to said closure mechanism 705. In some embodiments, the spring 740 and pivoting lever 750 are configured to rest in a closed-state, shown in FIG. 9A such that the pathway 730 of the tube 700 is deformed to restrict the flow of liquid. In such an embodiment, when force is applied, the pivoting lever 750 is drawn away from the tube 700 allowing the pathway 730 to rebound and allow the flow of liquid in an open-state shown in FIG. 9B.

In certain embodiments, a gravity-fed drain device 130, as shown in FIG. 9A and FIG. 9B, that comprises a tube 700, a pivoting lever 750 and a spring 740, further comprises an electric actuator 600. An electric actuator 600 in such embodiments applies a force to the pivoting lever 750 to draw the pivoting lever 750 toward or away from the tube 700. It will be appreciated that in certain embodiments, as shown in FIG. 9A and FIG. 9B, the electric actuator provides rotational motion to a cam element 760. It will be appreciated to those skilled in the art that a cam element 760 is a rotating or sliding piece in a mechanical linkage use in transforming rotary motion into linear motion, or vice versa. In such embodiments as shown in FIG. 9A and FIG. 9B, the cam element 760 comprises a plate cam form to translate rotational motion from the electric actuator 600 to linear motion and apply force to a surface of a push plate 765. The push plate 765 is affixed to the pivoting lever 750, as such a force applied to the push plate 765 acts to apply force to the pivoting lever 765. It will be appreciated to those skilled in the art that the embodiment of a closure mechanism 705 shown in FIG. 9A and FIG. 9B rests in a closed-state (FIG. 9A) due to residual tension applied by the spring 740. Such an embodiment changes to an open-state (FIG. 9B) when a force is applied through the actuation of the electric actuator 600.

Certain embodiments of a closure mechanism 750 further comprises a contact switch 770, shown in FIG. 9A and FIG. 9B. Such a contact switch 770 has electrical connection to a user interface panel 610, seen in FIG. 1A and FIG. 1B. In such an embodiment, once again referencing FIG. 9A and FIG. 9B, when a cam element 760 applies a force to a surface of the push plate 765, the pivoting lever 750 is drawn toward the tube 700. When the pivoting lever 750 reaches a predetermined position, a surface of the push plate 765 contacts the contact switch 770, which sends an electrical signal back to the user interface panel 610, seen in FIG. 1A and FIG. 1B. Such a signal indicates a status change of a pivoting lever 750, shown in FIG. 9A and FIG. 9B, such as a closed-state (FIG. 9A) or an open-state (FIG. 9B).

Figure 10:
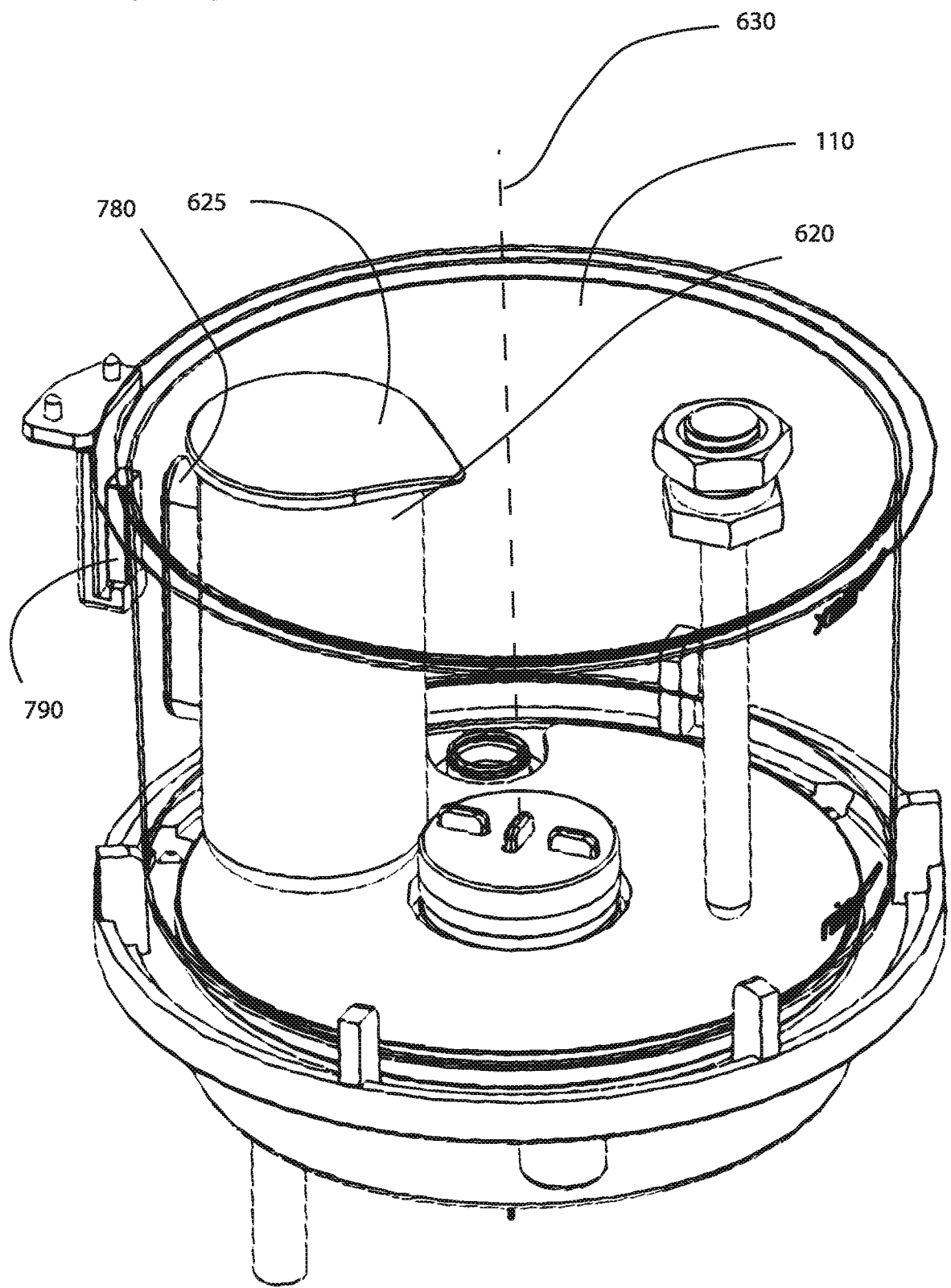
Figure 15A:
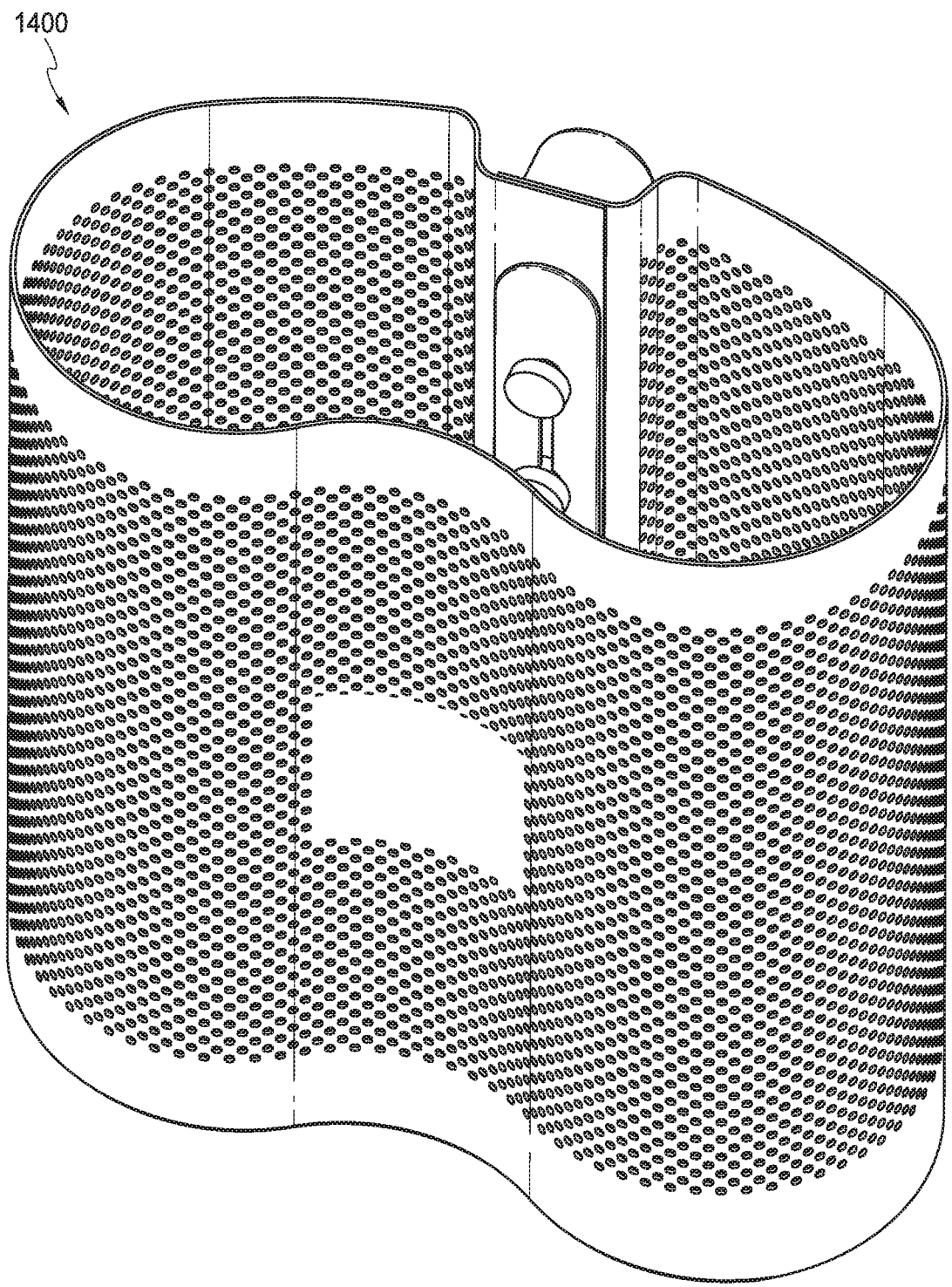
Figure 15B:
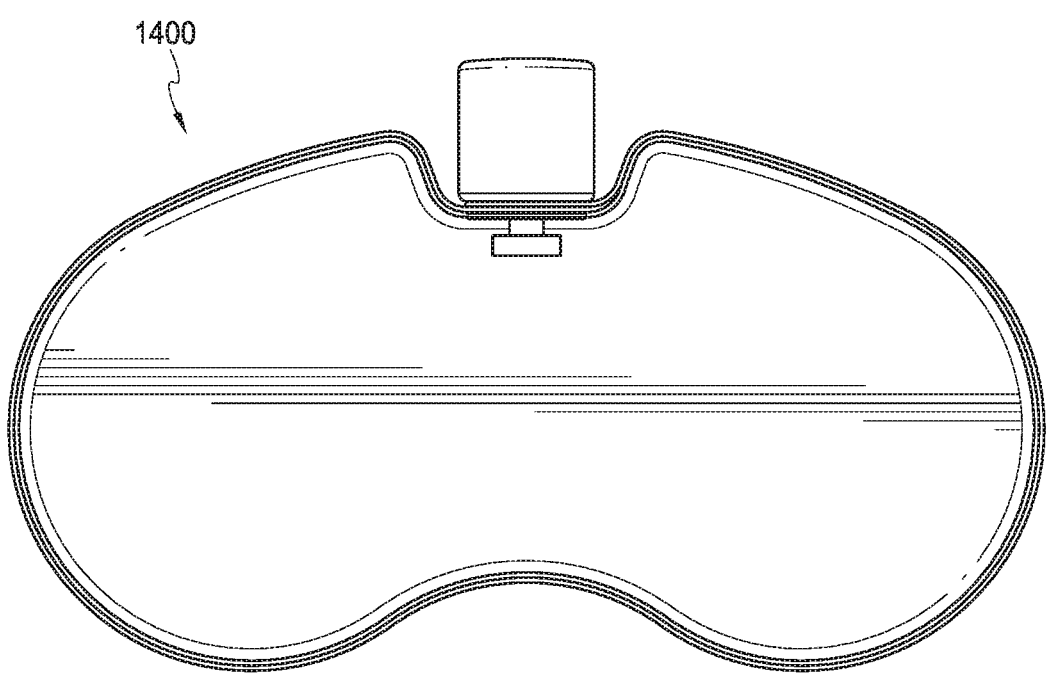
Figure 15C:
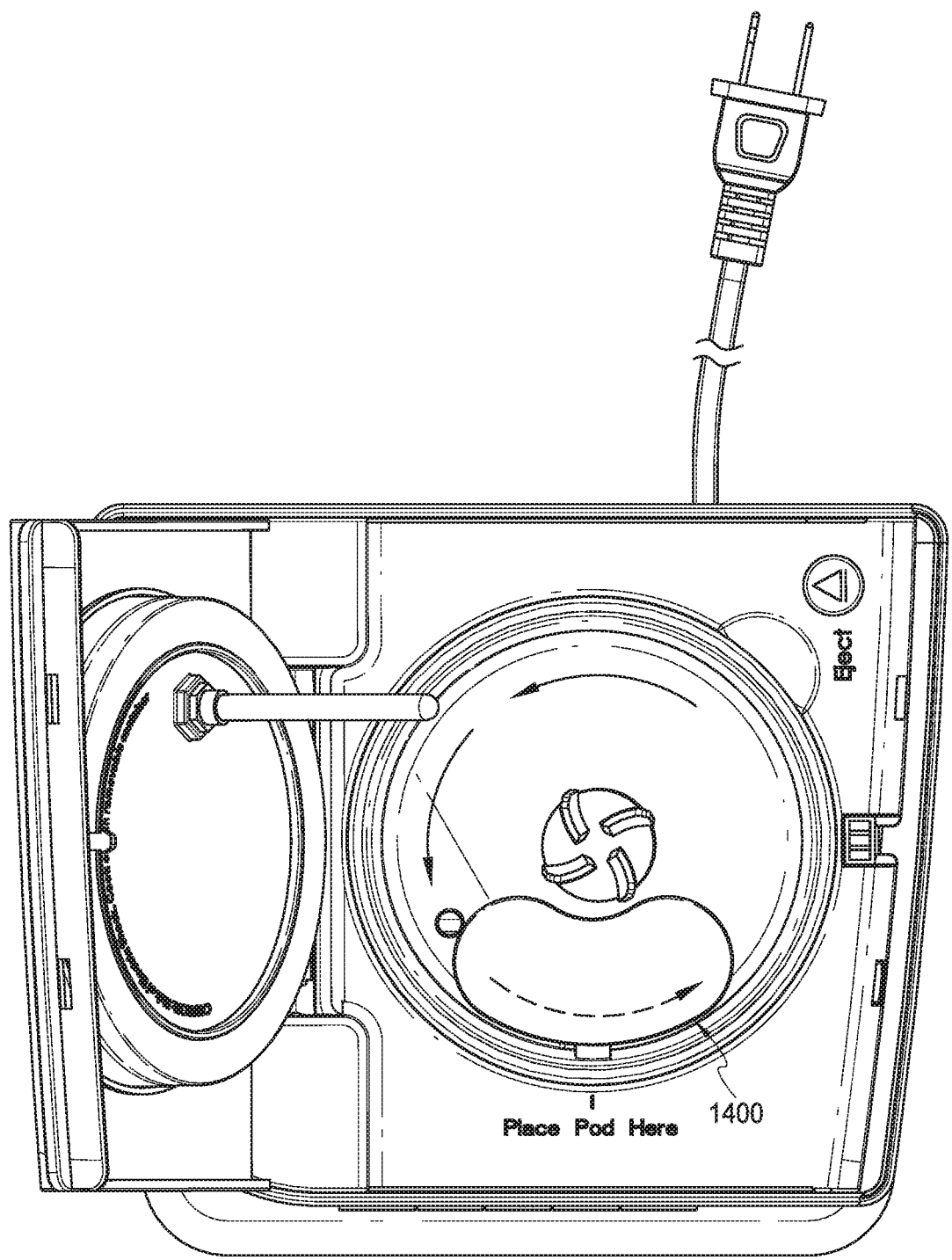

Certain embodiments, as shown in FIG. 10, comprise a permeable container 620 that may be placed into an infusing chamber 110. The permeable container 620 is configured to hold infusing material such that when placed into the infusing chamber 110, solvent held within the infusing chamber is able to flow through the walls of the permeable container 620. In certain embodiments, the permeable container is disposed away from a central axis 630 of the infusing chamber 110. The flow of solvent held within the infusing chamber 110, when churned by an agitator component 120 located at a central axis 630, is higher when offset from the central axis 630. It will be appreciated that infusing material as discussed herein may refer to loose infusing material or infusing material prepackaged in forms able to be deposited within the infusing chamber 110 or alternatively within a permeable container 620. Certain embodiments of the permeable container comprise an oblong shape, such as a kidney shape, as shown in FIG. 15A-FIG. 15B. The oblong shape provides increased laminar around the permeable container 1400 which results in more efficient flow dynamics, and allows for a faster recirculating rate of flow 1405. The oblong shape of the permeable container also increases the active infusion time, or the duration which solvent is in direct contact with the infusion material. The oblong shape provides an increased length consistent with the direction of flow of the solvent when agitated, thus increasing the active infusion time. Providing an increased active infusion time provides a more effective infusing process.

Certain embodiments, as shown in FIG. 10, comprise a permeable container 620 having a cap 625. Such a permeable container 620 may be removably affixed to the interior of the infusing chamber 110. In such embodiments, the permeable container 620 further comprises a first magnetic fixation element 780 affixed to the exterior of the permeable container. A second magnetic fixation element 790 is affixed to the exterior of the infusing chamber 110. It will be appreciated that removable fixation is achieved when the first magnetic fixation element 780 and the second magnetic fixation element 790 are brought in proximity to each other. It will be further appreciated that magnetic removable fixation may be achieved with a magnet element and a ferromagnetic element, or a plurality of magnets.

Figure 11:
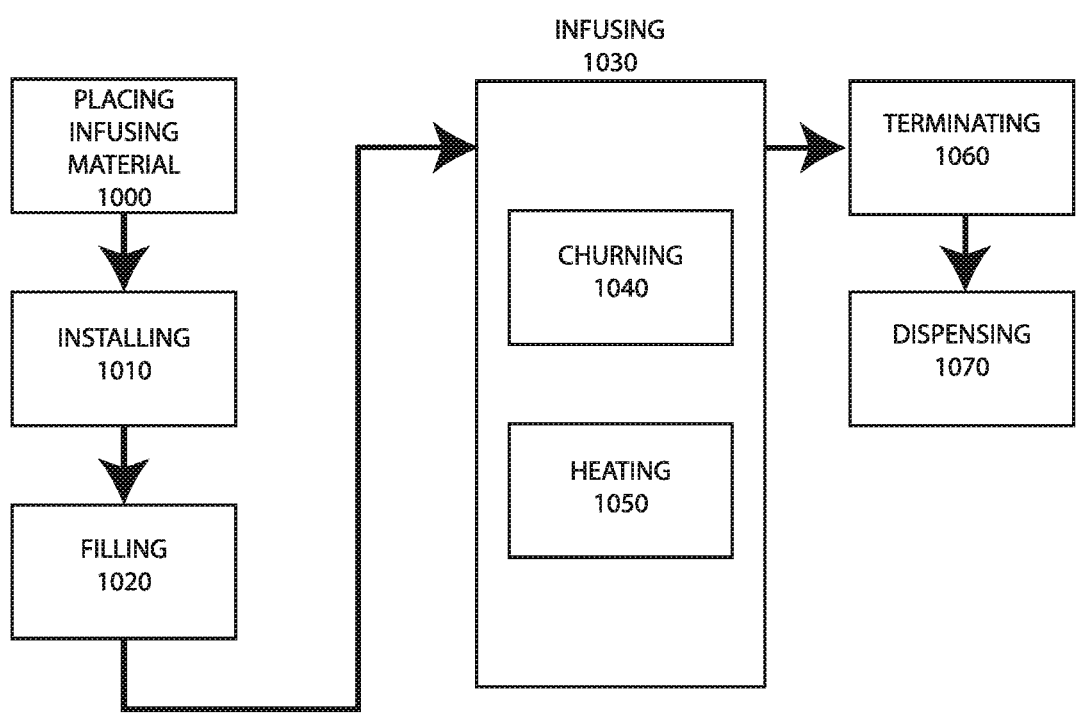

Certain embodiments of a method of infusing a solvent, shown in FIG. 11, as discussed herein comprises the placing of infusing material. This step involves the placing of infusing material into a permeable container 620, seen in FIG. 2. The step of installing 1010, as shown in FIG. 11, involves the installation of the permeable container 620, seen in FIG. 2, within an infusing chamber 110 of an infusing apparatus 100. The step of filling 1020, shown in FIG. 11, involves adding a solvent for infusing to the infusing chamber 110 shown in FIG. 2. The infusion step 1030, shown in FIG. 11, involves the infusing apparatus 100 set to an infusing mode by user input through a user interface panel 610, seen in FIG. 1A. The infusing step 1030, shown in FIG. 11, involves churning 1040 and heating 1050 steps. The churning step 1040, churns the solvent through the spinning of an agitator component 200 as seen in FIG. 2. In certain embodiments, the spinning of the agitator component 200, is maintained between 50 and 150 RPM while in other embodiments the rotational speed of the agitator component 200 is maintained between 70 and 90 RPM. In certain embodiments comprising an agitator component further comprising fins having a radial curvature, the agitator component rotational speed can be operated at speeds of 400 RPM without the entrainment of air within the solvent.

In certain embodiments, an agitator component is configured to provide mixing of air within the volume of the infusing chamber, thus providing a more consistent temperature throughout the volume of the infusing chamber. In certain embodiments, the mixing functionality results in a forced convective flow within the volume. It will be appreciated by those skilled in the art that a forced convective flow provides a more homogeneous temperature profile throughout the volume of the infusing chamber.

Figure 16A:
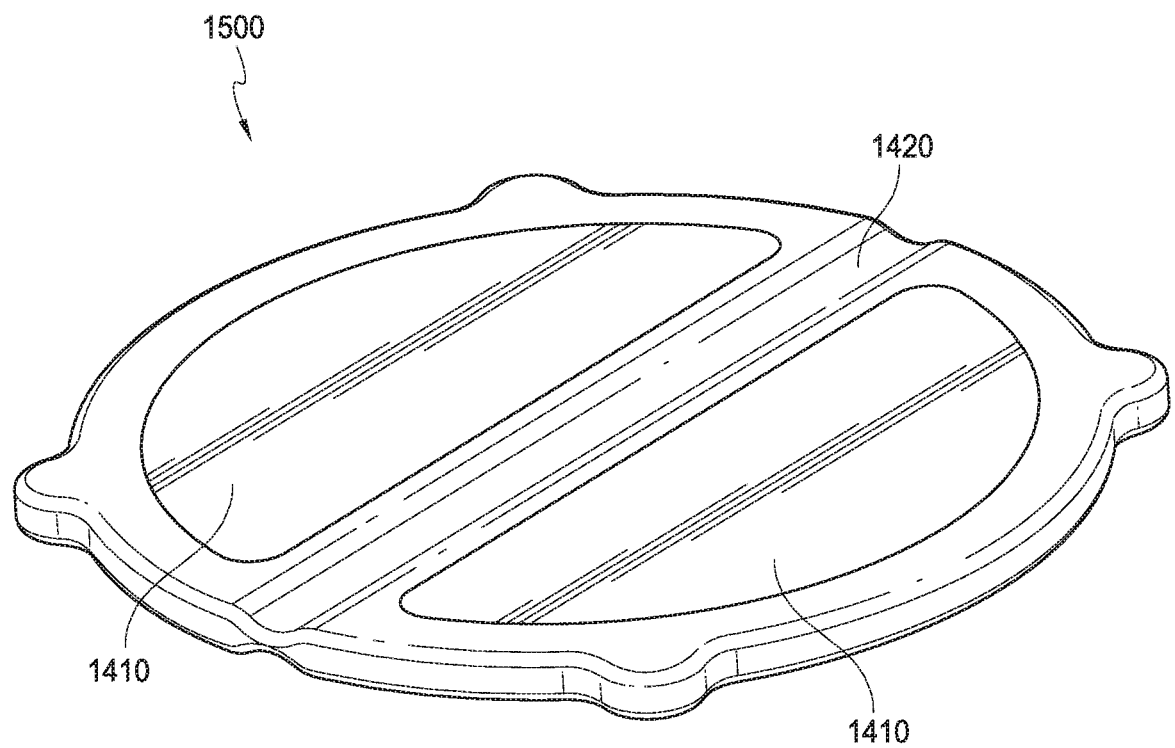
Figure 16B:
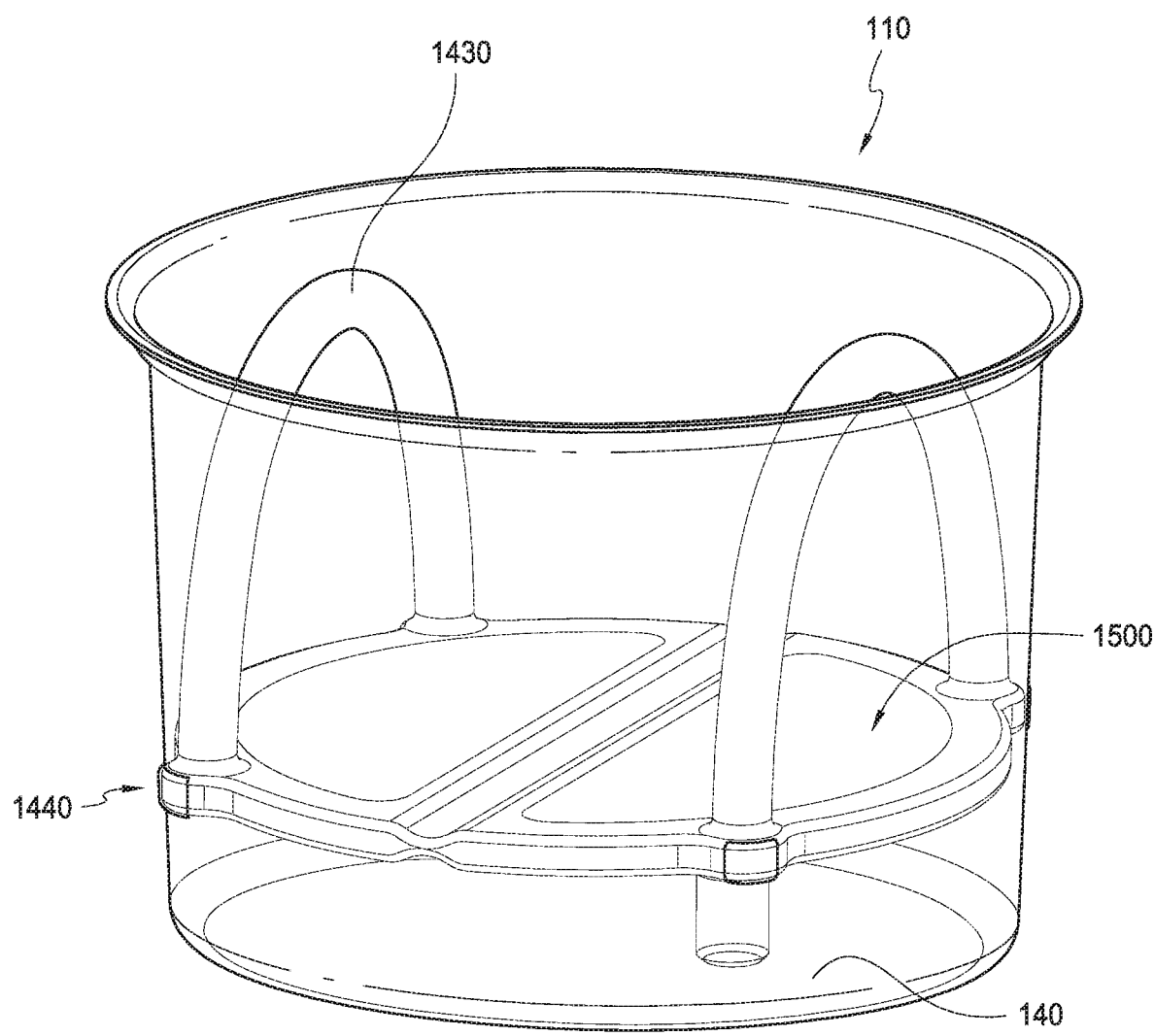

In certain embodiments, shown in FIG. 16A-FIG. 16B, a rack 1500 is suspended above the bottom surface 140 of the infusing chamber. The rack 1500 allows a user to place dry material upon the rack, thus preventing direct contact of the dry material with the bottom surface 140 of the infusing chamber. The bottom surface 140 of the infusing chamber of certain embodiments is in direct conductive thermal communication with the heater component 220 (FIG. 3B). Resultantly, the bottom surface 140 of the infusing chamber is at a temperature much higher than that of the air within the infusing chamber 110. Contact of the dry material with the bottom surface 140 of the infusing chamber may result in burning of the dry material, or uneven drying of the dry material during a dry process. Suspension of the dry material away from the bottom surface 140 of the infusing chamber provides a more even heating and drying of the material. Furthermore, offsetting the material from the bottom surface 140 of the infusing chamber allows for a more consistent airflow throughout the volume of the infusing chamber 110. A more consistent airflow provides a more homogenous temperature profile through the infusing chamber 110. In certain embodiments the rack 1400 comprises a perforated surface allowing airflow through the rack 1400, while other embodiments (as shown in FIG. 16A-FIG. 16B) comprise a solid surface. In certain embodiments, the rack 1400 comprises a first portion 1410 and a second portion 1410, interconnected with a hinged element 1420. The hinged element 1420 of certain embodiments comprises a living hinge comprised of a flexible material such as silicone, thus the rack can be folded and unfolded for use, placement, and removal from the infusing chamber 140. In certain embodiments, the rack 1400 further comprises handles, while certain embodiments comprise recesses 1440 within the infusing chamber 140 configured to mate with the rack 1400 to offset the rack from the bottom surface 140 of the infusing chamber.

Figure 17:
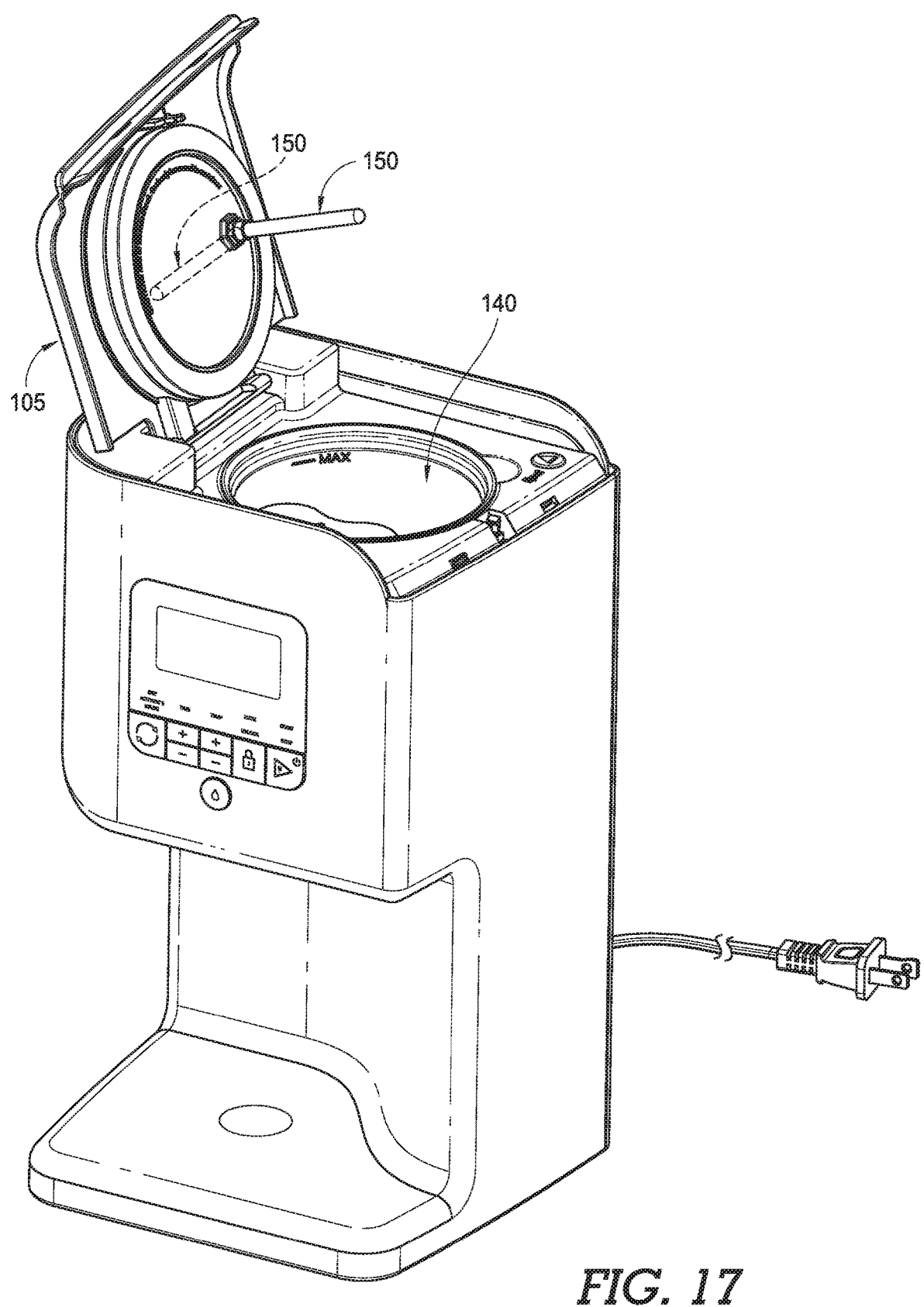

Considering certain embodiments, seen in FIG. 17, which comprise a dry process and infusing process, a first temperature measuring device 150 (not shown) is disposed in contact with the external bottom surface of the infusing chamber 140, and a second temperature measuring device 150 is disposed within the volume of the infusing chamber 140. The first temperature measuring device 150 monitors the temperature of the bottom surface of the infusing chamber. The second temperature measuring device 150 monitors the air temperature within the infusing chamber during a drying process, and monitors the solvent temperature during an infusing process.

In certain embodiments, the second temperature measuring device 150 is configured to pivot from a vertical configuration—hanging downward into the volume of the infusing chamber 110, to a horizontal configuration—adjacently parallel to the bottom surface of the lid 105. It will be appreciated that in a dry process mode, the hot air will preferentially reside toward the upper portions of the volume of the infusing chamber 110. The disposition of the second temperature measuring device 150 as adjacently parallel to the bottom surface of the lid 105 allows a user to place more dry material within the infusing chamber. Thus, in a dry process mode, it is desired in certain embodiments for the second temperature measuring device 150 to be adjacently parallel to the bottom surface of the lid 105. In an infusion mode, it will be appreciated that the higher heat transfer properties of the solvent will result in a more homogenous temperature profile. However, it will be further appreciated that the solvent closest to the bottom surface 140 of the infusing chamber—or the surface which is in nearest proximity to the heating component—will exhibit the highest temperatures. Thus, it is advantageous to measure the temperature of the solvent in close proximity to the bottom surface of the infusing chamber 110, or the surface which is in nearest proximity to the heating element.

During a heating step 1050 (FIG. 11), the infusing apparatus 100, shown in FIG. 3B, heats the solvent using a heater component 220 and maintains the solvent at a consistent set-point temperature. In some embodiments, the heating 1050, seen in FIG. 11, maintains a solvent temperature below the boiling point of the solvent. After a predetermined time, the step of terminating 1060 the infusing 1030 step is executed. The predetermined time of infusion is based upon variables such as the infusing material and solvent used in addition to the user's preference surrounding the potency of resulting infusion. The predetermined time may span only minutes, or may extend beyond several hours. Then the step of dispensing 1070 is then performed by activating a dispensing 1070 step through the user interface panel 610 seen in FIG. 1A. When activating the dispensing 1070 step, shown in FIG. 11, infusion flows through an aperture 400, shown in FIG. 8 through a gravity-fed drain device 130 and into a dispensing area 112.

Figure 18A:
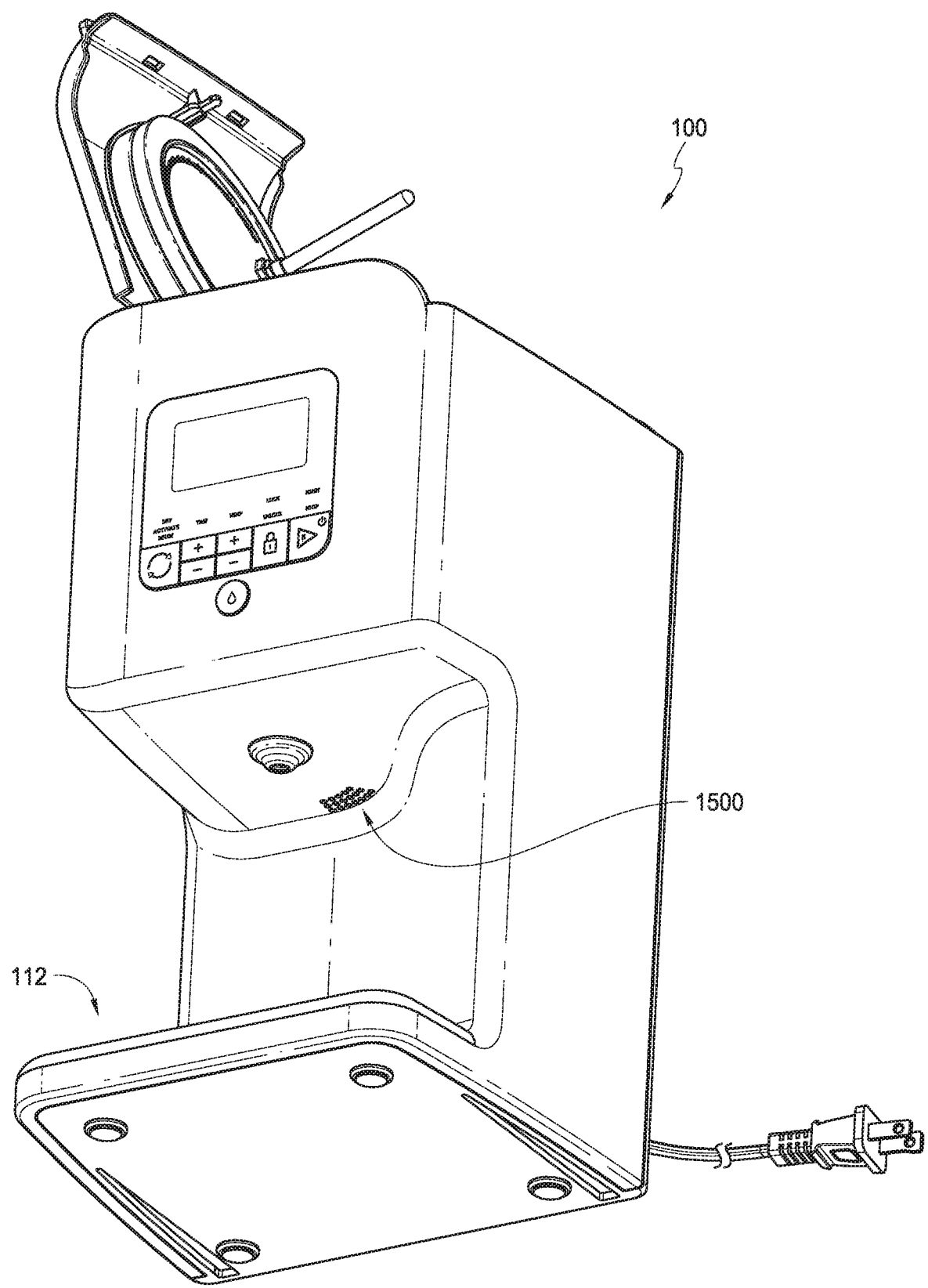
Figure 18B:
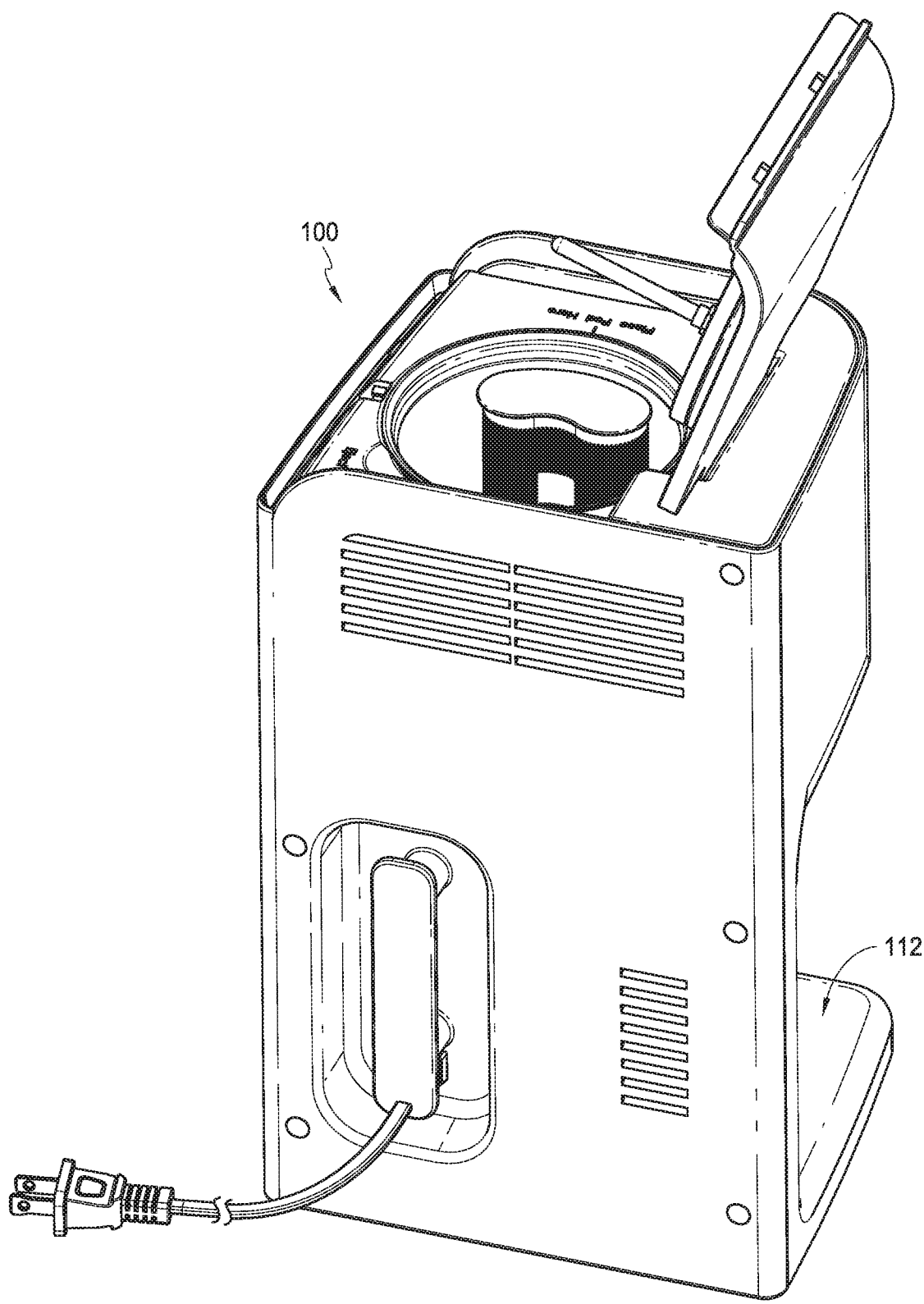

Certain embodiments of the present invention, seen in FIG. 18A further comprise audible notifications, delivered through a speaker oriented in the housing of the infusing apparatus 100, oriented above the dispensing area 112. Certain embodiments further comprise apertures 1500 permitting the increased attenuation of the audible notifications. The audible notifications may be used to alert a user of the initiation or termination of certain processes, such as a dry process or an infusing process involving solvents.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein.

The terms "first," "second," "top," "bottom," etc., as used herein, are intended for illustrative purposes only and do not limit the embodiments in any way. Additionally, the term "plurality," as used herein, indicates any number greater than one, either disjunctively or conjunctively, as necessary, up to an infinite number. Further, "Providing" an article or apparatus, as used herein, refers broadly to making the article available or accessible for future actions to be performed on the article, and does not connote that the party providing the article has manufactured, produced, or supplied the article or that the party providing the article has ownership or control of the article. Accordingly, while specific embodiments have been illustrated and described, numerous modifications come to mind without significantly departing from the spirit of the invention and the scope of protection is only limited by the scope of the accompanying Claims.

What is claimed is:

1. An infusing apparatus comprising:
    an infusing chamber configured to hold a predetermined amount of a solvent, said infusing chamber having an aperture through a bottom surface of said infusing chamber;
    a lid which is removably disposed over the infusing chamber
    an agitator component disposed within the infusing chamber;
    a heating component located against an external surface of said infusing chamber;
    a first temperature measuring device coincident with an external surface of the infusing chamber, and connected to a first temperature controller;
    a second temperature measuring device disposed within the infusing chamber, and connected to a second temperature controller, wherein the second temperature measuring device is affixed to the lid of the apparatus and configured to pivot alternatively between a vertical configuration and a horizontal configuration;
    a gravity-fed drain device configured to interface with the aperture through the bottom surface of said infusing chamber, wherein said gravity-fed drain device prevents the flow of the solvent through said aperture when said gravity-fed drain device is in a closed-state and allows the flow of the solvent when said gravity-fed drain device is in an open-state; and
    a user interface panel.

2. The apparatus of claim 1, further comprising a rack offset vertically upward from the bottom surface of the infusing chamber.

3. The apparatus of claim 2, further comprising recesses in a sidewall of the infusing chamber wherein the rack is constrained to a position offset vertically from the bottom surface, when the rack is mated with the recesses of the infusing chamber.

4. The apparatus of claim 2, wherein the rack comprises a first portion and a second portion interconnected by a hinge element.

5. The apparatus of claim 4, wherein the hinge element comprises a living hinge.

6. The apparatus of claim 1, wherein the agitator is magnetically actuatable and removably affixed to the bottom surface of the infusing chamber.

7. The apparatus of claim 1, further comprising a permeable container disposed within the infusing chamber, wherein the permeable container is removably affixable to a sidewall of the infusing chamber.

8. The apparatus of claim 7, wherein the permeable container is offset from a vertical central axis of said infusing chamber so as to provide increased flow induced by the agitator component.

9. The apparatus of claim 8, wherein the permeable container is magnetically affixable to an internal surface of the infusing chamber.

10. The apparatus of claim 1, wherein the gravity-fed drain device comprises a tube having a female threaded feature at a first distal end of the tube;
    a male threaded feature having a pathway therethrough, affixed to the external surface of the infusing chamber interconnected with the aperture in the infusing chamber;
    wherein the male threaded feature and female threaded feature are configured to mate, thus the tube is threadably affixed to the infusing chamber.

11. The apparatus of claim 10, wherein said gravity-fed drain device further comprises a closure mechanism configured to close the tube; and said tube having a second distal end of directed downwardly toward a dispensing area, wherein closing the tube configures the gravity-fed drain device in a closed-state.

12. The apparatus of claim 11, wherein said closing mechanism further comprises:

an electric actuator;

a cam element connected to said electric actuator;

a pivoting lever; and a spring having a first distal end connected to a fixed element and a second distal end connected to said pivoting lever;

wherein said cam applies a linear force against said pivoting lever when said electric actuator rotates.

\* \* \* \* \*